(12) United States Patent
Kim

(10) Patent No.: US 10,782,405 B2
(45) Date of Patent: Sep. 22, 2020

(54) RADAR FOR VEHICLE AND VEHICLE PROVIDED THEREWITH

(71) Applicant: LG Electronics Inc., Seoul (KR)

(72) Inventor: Yeejung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 261 days.

(21) Appl. No.: 15/747,375

(22) PCT Filed: Jul. 22, 2016

(86) PCT No.: PCT/KR2016/008000
§ 371 (c)(1),
(2) Date: Jan. 24, 2018

(87) PCT Pub. No.: WO2017/018729
PCT Pub. Date: Feb. 2, 2017

(65) Prior Publication Data
US 2018/0217255 A1    Aug. 2, 2018

(30) Foreign Application Priority Data

Jul. 24, 2015 (KR) .................. 10-2015-0105318

(51) Int. Cl.
*G01S 13/931* (2020.01)
*B60W 50/14* (2020.01)
(Continued)

(52) U.S. Cl.
CPC ............ *G01S 13/931* (2013.01); *B60K 35/00* (2013.01); *B60W 50/14* (2013.01); *G01S 7/4026* (2013.01);
(Continued)

(58) Field of Classification Search
CPC .......... B60K 2370/179; B60K 2370/21; B60K 35/00; B60K 2370/48; B60R 21/0134;
(Continued)

(56) References Cited

U.S. PATENT DOCUMENTS 5,943,017 A * 8/1999 Cosenza ................. H01Q 1/38
343/700 MS
7,417,585 B2 * 8/2008 Yamagami ............ G01S 13/426
342/118
(Continued)

*Primary Examiner* — Olumide Ajibade Akonai
(74) *Attorney, Agent, or Firm* — Fish & Richardson P.C.

(57) ABSTRACT

A radar for a vehicle includes: an antenna including a nonlinear patch array; a transmitter to externally transmit a transmission signal through the antenna; a receiver to signal-process a reception signal received from the antenna; and a processor to control to operate a portion of the nonlinear patch array and control to change at least one of a direction, an angle, or an intensity of a beam pattern output from the antenna based on image related information from a camera during vehicle driving, wherein when the vehicle enters a curved road, the processor detects lane region based on an image from the camera, calculates curvature information of the curved road using a pixel value of the lane region, and controls to change a direction of a beam pattern output from the antenna based on the curvature information. The radar beam pattern is configured to vary based on the camera image.

11 Claims, 29 Drawing Sheets

(51) Int. Cl.
*B60K 35/00* (2006.01)
*G06K 9/20* (2006.01)
*G01S 7/40* (2006.01)
*G01S 13/86* (2006.01)
*B60R 21/0134* (2006.01)
*G06K 9/00* (2006.01)
*B60R 1/00* (2006.01)
*G01S 13/02* (2006.01)
*G05D 1/02* (2020.01)
*H04N 7/18* (2006.01)

(52) U.S. Cl.
CPC ............ *G01S 13/867* (2013.01); *G06K 9/209* (2013.01); *B60K 2370/179* (2019.05); *B60K 2370/21* (2019.05); *B60K 2370/48* (2019.05); *B60R 1/00* (2013.01); *B60R 21/0134* (2013.01); *B60R 2300/804* (2013.01); *B60Y 2400/3017* (2013.01); *G01S 2013/0254* (2013.01); *G01S 2013/9322* (2020.01); *G05D 1/0257* (2013.01); *G05D 2201/0213* (2013.01); *G06K 9/00798* (2013.01); *G06K 9/00805* (2013.01); *H04N 7/183* (2013.01)

(58) Field of Classification Search
CPC .. B60R 2300/804; B60R 1/00; H01Q 21/065; H01Q 25/00; H01Q 3/26; H01Q 21/061; H01Q 21/24; H01Q 3/24; G01S 13/931; G01S 2013/9322; G01S 2013/9357; G01S 13/867; G01S 7/4026; G01S 2007/4034; G01S 2007/4091; G01S 2013/9375; G01S 13/00; G01S 13/72; G01S 2013/0245; G01S 2013/0254; G01S 2013/936; G01S 7/003; G01S 7/032; G01S 13/003; G01S 2013/0272; G01S 2013/0263; G01S 7/282; G01S 7/352; B60W 50/14; G05D 1/0257; G05D 2201/0213; G06K 9/00805
See application file for complete search history.

(56) References Cited

U.S. PATENT DOCUMENTS

2002/0080617 A1* 6/2002 Niwa ............... B60Q 1/085
362/465
2004/0080450 A1* 4/2004 Cheong ............. G01S 7/4026
342/118
2011/0267217 A1* 11/2011 Hildebrandt .......... G01S 7/032
342/70
2016/0097847 A1* 4/2016 Loesch ............... G01S 13/42
342/156

* cited by examiner

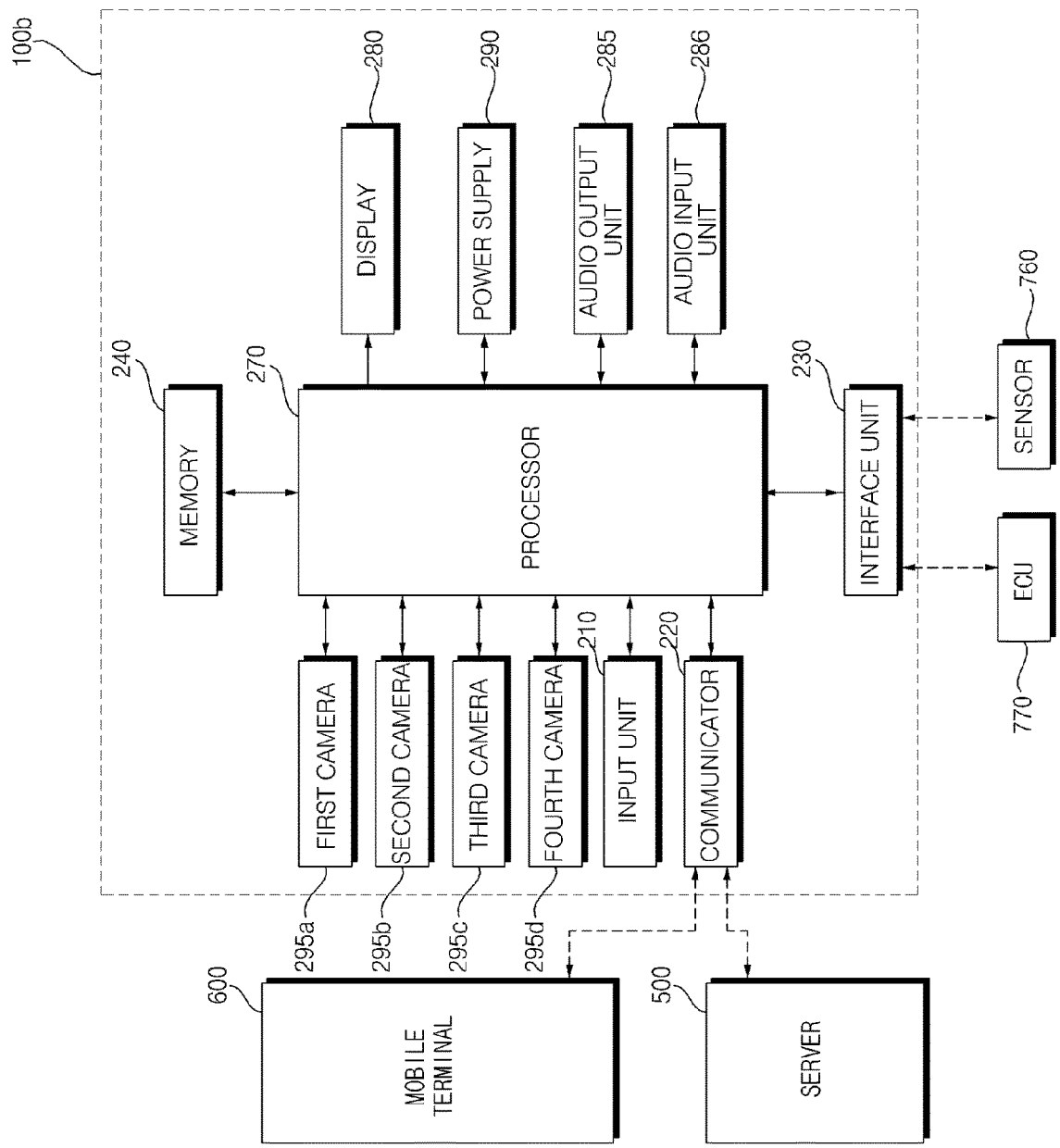

RADAR FOR VEHICLE AND VEHICLE PROVIDED THEREWITH

CROSS-REFERENCE TO RELATED APPLICATIONS

This application is a National Stage application under 35 U.S.C. § 371 of International Application No. PCT/KR2016/008000, filed Jul. 22, 2016, which claims the benefit of Korean Application No. 10-2015-0105318, filed on Jul. 24, 2015. The disclosures of the prior applications are incorporated by reference in their entirety.

TECHNICAL FIELD

The present invention relates to a radar for a vehicle and a vehicle provided therewith, and more particularly, to a radar for a vehicle for changing a radar beam pattern based on a camera image and a vehicle provided therewith.

BACKGROUND ART

A vehicle is a device for moving a passenger in a desired direction. A representative example thereof is an automobile.

In accordance with current trends, for convenience of a vehicle user, various sensors and electronic devices have been applied to vehicles.

In particular, in accordance with current trends, various devices for user driving convenience have been developed and radars have been used to detect a distance from a surrounding object of a vehicle.

There have been various attempts to enhance accuracy of distance detection of a radar.

DISCLOSURE

Technical Problem

An object of the present invention devised to solve the problem lies in a radar for a vehicle for changing a radar beam pattern based on a camera image and a vehicle provided therewith.

Technical Solution

The object of the present invention can be achieved by providing a radar for a vehicle, including an antenna including a nonlinear patch array, a transmitter to externally transmit a transmission signal through the antenna; a receiver to signal-process a reception signal received from the antenna; and a processor to control to operate a portion of the nonlinear patch array and control to change at least one of a direction, an angle, or an intensity of a beam pattern output from the antenna based on image related information from a camera during vehicle driving, wherein when the vehicle enters a curved road, the processor detects lane region based on an image from the camera, calculate curvature information of the curved road using a pixel value of the lane region, and control to change a direction of a beam pattern output from the antenna based on the curvature information.

In another aspect of the present invention, provided herein is a vehicle including a camera, a radar, a display, and an audio output unit, wherein the radar includes an antenna including a nonlinear patch array, a transmitter to externally transmit a transmission signal through the antenna; a receiver to signal-process a reception signal received from the antenna; and a processor to control to operate a portion of the nonlinear patch array and control to change at least one of a direction, an angle, or an intensity of a beam pattern output from the antenna based on image related information from a camera during vehicle driving, wherein when the vehicle enters a curved road, the processor detects lane region based on an image from the camera, calculate curvature information of the curved road using a pixel value of the lane region, and control to change a direction of a beam pattern output from the antenna based on the curvature information.

Advantageous Effects

An embodiment of the present invention provides a radar for a vehicle, and a vehicle including the same, and, in this case, the radar for the vehicle includes an antenna including a nonlinear patch array, a transmitter to externally transmit a transmission signal through the antenna; a receiver to signal-process a reception signal received from the antenna; and a processor to control to operate a portion of the nonlinear patch array and control to change at least one of a direction, an angle, or an intensity of a beam pattern output from the antenna based on image related information from a camera during vehicle driving, wherein when the vehicle enters a curved road, the processor detects lane region based on an image from the camera, calculate curvature information of the curved road using a pixel value of the lane region, and control to change a direction of a beam pattern output from the antenna based on the curvature information, thereby varying a radar beam pattern based on a camera image.

In particular, an electrical signal applied to the transmitter may be varied to vary at least one of the direction, the angle, or the intensity of the beam pattern output from the antenna based on the image related information from the camera during vehicle driving, thereby varying a radar beam pattern based on the camera image.

Accordingly, distance detection or phase detection may be accurately performed using a radar.

DESCRIPTION OF DRAWINGS

FIGS. 3C and 3D show internal blocks of various examples of the autonomous driving device of FIG. 1.

BEST MODE

Exemplary embodiments of the present invention will be described with reference to the attached drawings.

In addition, the suffixes "module" and "unit" of elements herein are used for convenience of description and do not have any distinguishable meanings or functions. Accordingly, "module" and "unit" can be used interchangeably.

In the specification, the term "vehicle" may be interpreted as an including an automobile and a motobicycle. Hereinafter, the vehicle will be described in terms of an automobile.

In the specification, the term "vehicle" may be interpreted as an including all of an internal combustion vehicle including an engine as a power source, a hybrid vehicle including an engine and an electric motor as a power source, an electric vehicle including an electric motor as a power source, and so on.

Figure 1:
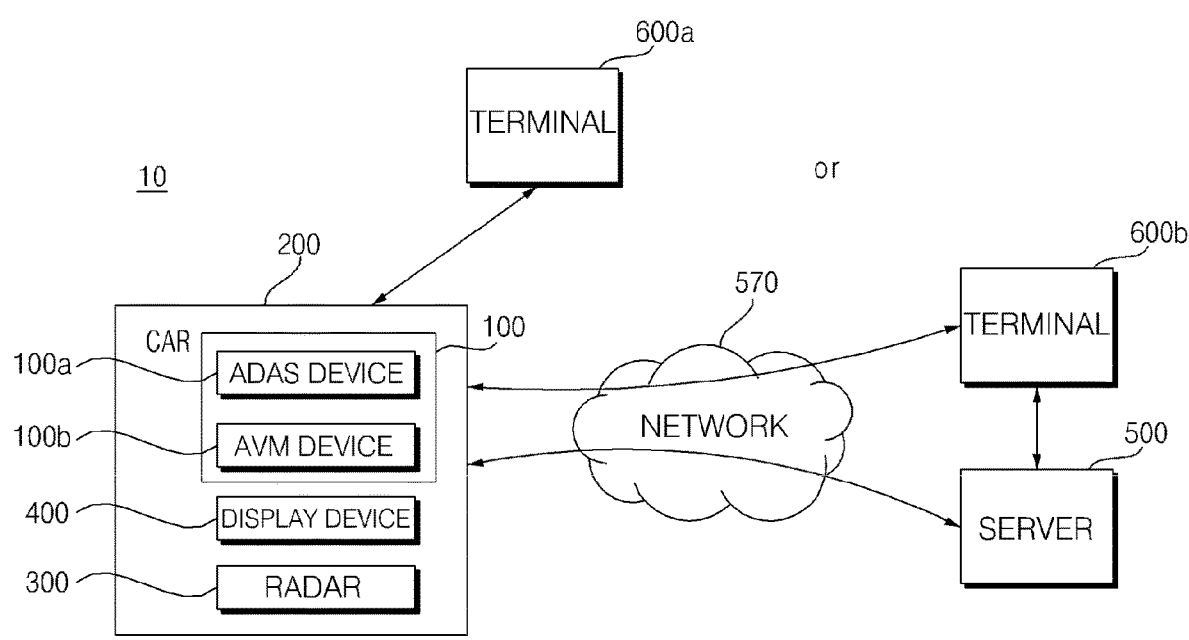
FIG. 1 is a diagram showing a concept of a vehicle communication system including an autonomous driving device according to an embodiment of the present invention.

FIG. 1 is a diagram showing a concept of a vehicle communication system including an autonomous driving device according to an embodiment of the present invention.

Referring to the drawing, a vehicle communication system 10 may include a vehicle 200, terminals 600a and 600b, and a server 500.

The vehicle 200 may include an autonomous driving device 100, a vehicle display device 400, and so on, provided therein.

The autonomous driving device 100 may include a vehicle driving auxiliary device 100a, an around view providing device 100b, and so on.

For example, for vehicle autonomous driving, when current speed is equal to or greater than predetermined speed, vehicle autonomous driving may be performed through the vehicle driving auxiliary device 100a and, when the current speed is less than the predetermined speed, vehicle autonomous driving may be performed through the around view providing device 100b.

As another example, for vehicle autonomous driving, the vehicle driving auxiliary device 100a and the around view providing device 100b may be operated together but, when current speed is equal to or greater than predetermined speed, a weight may be further applied to the vehicle driving auxiliary device 100a and vehicle autonomous driving may be performed in terms of the vehicle driving auxiliary device 100a and, when the current speed is less than the predetermined speed, a weight may be further applied to the around view providing device 100b and vehicle autonomous driving may be performed in terms of the around view providing device 100b.

The vehicle driving auxiliary device 100a, the around view providing device 100b, and the vehicle display device 400 may exchange data with the terminals 600a and 600b or the server 500 using a communicator (not shown) included in each of the vehicle driving auxiliary device 100a, the around view providing device 100b, and the vehicle display device 400 or a communicator included in the vehicle 200.

For example, when the mobile terminal 600a is positioned inside or in the vicinity of a vehicle, at least one of the vehicle driving auxiliary device 100a, the around view providing device 100b, or the vehicle display device 400 may exchange data with the terminal 600a via short-range communication.

As another example, when the terminal 600b is positioned at a remote site outside a vehicle, at least one of the vehicle driving auxiliary device 100a, the around view providing device 100b, or the vehicle display device 400 may exchange data with the terminal 600b or the server 500 through a network 570 via long-range communication (mobile communication, etc.).

The terminals 600a and 600b may be a mobile terminal such as a portable phone, a smartphone, a tablet personal computer (PC), and a wearable device such as a smartwatch. Alternatively, the terminals 600a and 600b may be a fixed type terminal such as a television (TV) or a monitor. Hereinafter, the terminal 600 will be described in terms of a mobile terminal such as a smartphone.

The server 500 may be a server provided by a vehicle manufacturer or a server managed by a provider for providing a vehicle related service. For example, the server 500 may be a server managed by a provider for providing a road traffic situation, etc.

The vehicle driving auxiliary device 100a may signal-process a stereo image received from a stereo camera 195 based on computer vision to generate and provide vehicle related information. Here, the vehicle related information may include vehicle control information for direct control of a vehicle or vehicle driving auxiliary information for driver guidance for a vehicle driver.

The vehicle driving auxiliary device 100a may generate and provide a control signal for vehicle autonomous driving based on the stereo image received from the stereo camera 195 and distance information from a surrounding object of the vehicle from a radar 300. For example, the vehicle driving auxiliary device 100a may output a control signal for control of at least one of a steering driver, a brake driver, or a driving source driver, during vehicle autonomous driving.

The around view providing device 100b may transmit a plurality of images that are captured by a plurality of cameras 295a, 295b, 295c, and 295d, respectively, to a processor 270 (refer to FIG. 3C or 3D) or the like in the vehicle 200 and the processor 270 (refer to FIG. 3C or 3D) may combine the plurality of images to generate and provide an around view image.

The vehicle display device 400 may be an audio video navigation (AVN) device.

The vehicle display device 400 may include a space recognition sensor and a touch sensor and, as such, remote approach may be detected by the space recognition sensor and touch approach at a short distance may be detected through the touch sensor. In addition, the vehicle display device 400 may provide a user interface corresponding to a detected user gesture or touch.

The radar 300 may externally transmit a radar signal or a radar beam using an antenna and may receive a signal or beam reflected by a surrounding object of a vehicle. Based on a difference between the transmitted signal and the received signal, the radar 300 may calculate distance or phase information from the surrounding object of the vehicle.

To enhance accuracy of distance detection of a radar, an output direction of a radar beam may be an important factor.

For example, when the vehicle 200 passes over an uphill road or a speed bump, the vehicle 200 is inclined back and forth due to a quick start, a sudden stop, or the like, or the vehicle 200 is inclined back and forth due to internal weight of the vehicle 200, the radar 300 may be tilted and, thus, a beam from the radar 300 may not be capable of being directed forward.

It may be possible to detect a distance from an object that is positioned about 100 m in front of the vehicle 200 through the radar 300 but, as described above, when the vehicle 200 passes over an uphill road, a speed bump, or the like, a direction of a laser beam emitted from the radar 300 may be instantly directed in a direction that is not the direction of the front object.

According to the present invention, to overcome this point, a moving direction of the radar 300 in the vehicle 200 may be estimated based on an image from a camera and at least one of a direction, an angle, or an intensity of a beam pattern output from an antenna 310 may be controlled in consideration of the estimated moving direction.

When this method is used, a radar beam pattern may be simply varied based on the camera image and, accordingly, an accurate distance or phase may be detected using the radar 300.

The radar 300 for a vehicle will be described below in more detail with reference to FIG. 8.

Figure 2A:
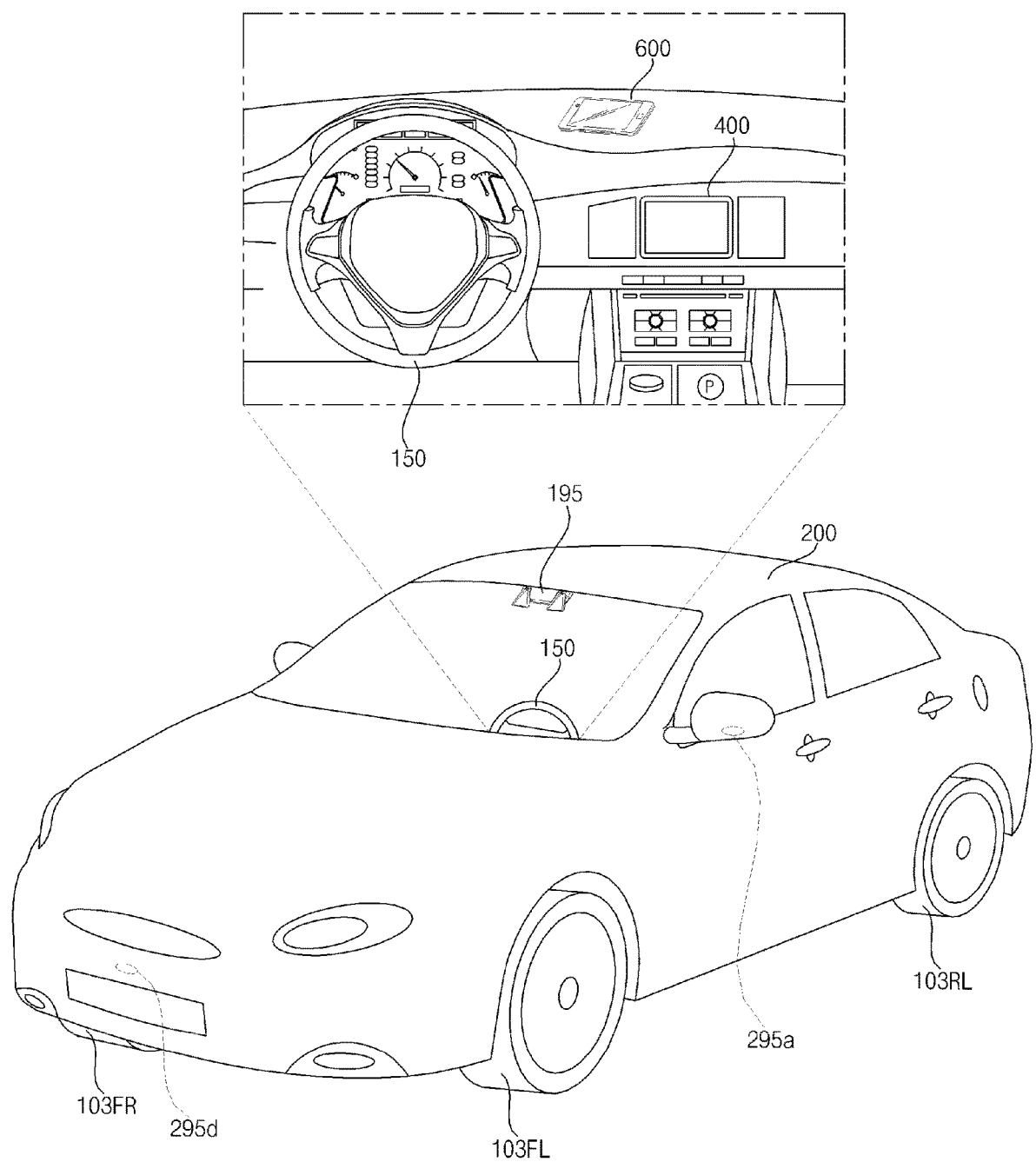
FIG. 2A is a diagram showing an outer appearance of a vehicle including various cameras.

FIG. 2A is a diagram showing an outer appearance of a vehicle including various cameras.

Referring to the drawing, the vehicle 200 may include wheels 103FR, 103FL, and 103RL, . . . , which are rotated by a power source, a steering wheel 250 for steering the vehicle 200, the stereo camera 195 included in the vehicle 200 for the vehicle driving auxiliary device 100*a* of FIG. 1, and the plurality of cameras 295*a*, 295*b*, 295*c*, and 295*d* installed in the vehicle 200 for the autonomous driving device 100 of FIG. 1. The drawing illustrates only the left camera 295*a* and the front camera 295*d* for convenience.

The stereo camera 195 may include a plurality of cameras and a stereo image captured by the plurality of cameras may be signal-processed by the vehicle driving auxiliary device 100*a* (refer to FIG. 3).

The drawing illustrates the case in which the stereo camera 195 includes two cameras.

When vehicle speed is equal to or less than predetermined speed or the vehicle moves backward, the plurality of cameras 295*a*, 295*b*, 295*c*, and 295*d* may be activated to respectively acquire captured images. The images captured by the plurality of cameras may be signal-processed in the around view providing device 100*b* (refer to FIG. 3C or 3D).

Figure 2B:
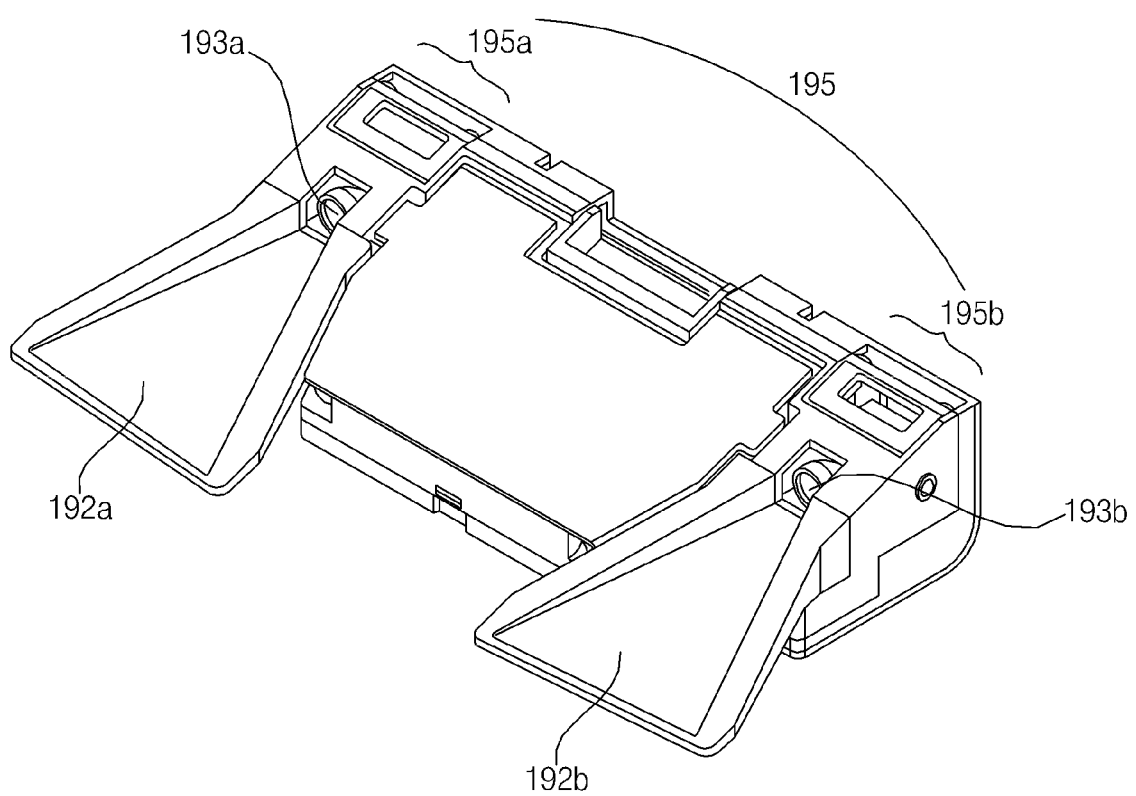
FIG. 2B is a diagram showing an outer appearance of a stereo camera attached to the vehicle of FIG. 2A.

FIG. 2B is a diagram showing an outer appearance of a stereo camera attached to the vehicle of FIG. 2A.

Referring to the drawing, a stereo camera module 195 may include a first camera 195*a* including a first lens 193*a* and a second camera 195*b* including a second lens 193*b*.

The stereo camera module 195 may include a first light shield 192*a* and a second light shield 192*b*, for shielding light incident on the first lens 193*a* and the second lens 193*b*, respectively.

The stereo camera module 195 of the drawing may be detachably installed on a ceiling or windshield of the vehicle 200.

The vehicle driving auxiliary device 100*a* (refer to FIG. 3) including the stereo camera module 195 may acquire a stereo image of a front side of a vehicle from the stereo camera module 195, perform disparity detection based on the stereo image, detect an object in at least one stereo image based on disparity information, and continuously track movement of the object after the object is detected.

Figure 2C:
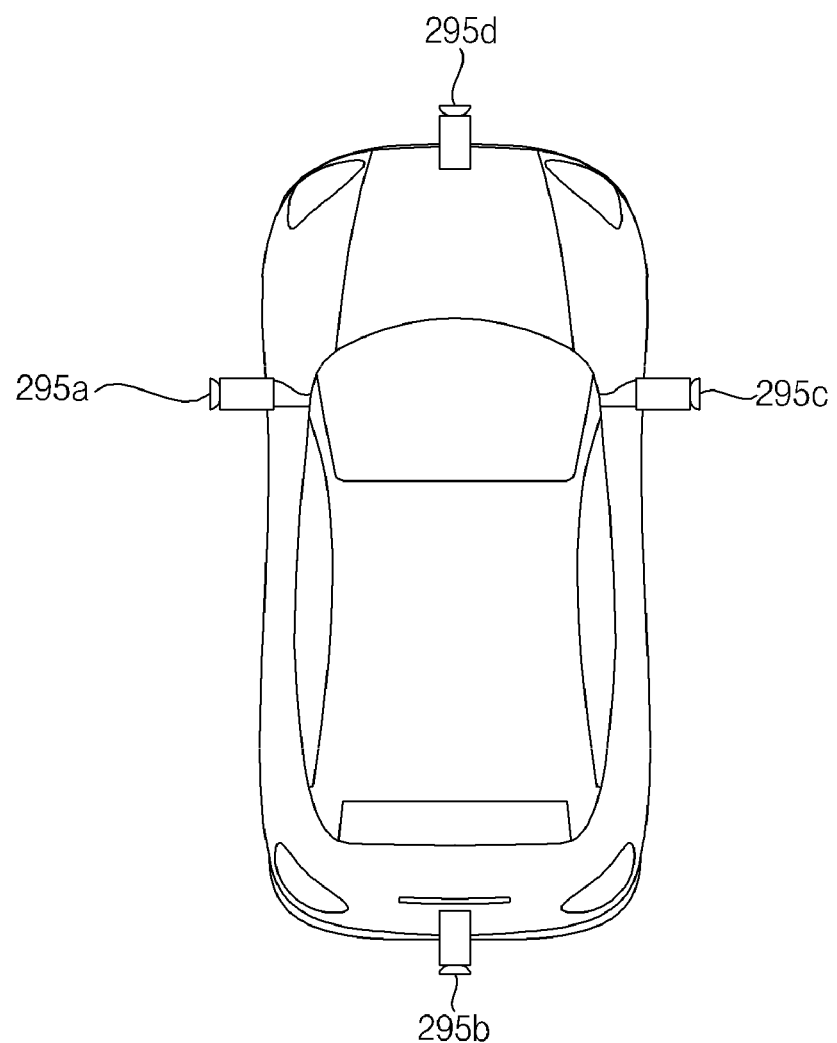
FIG. 2C is a schematic diagram showing positions of a plurality of cameras attached to the vehicle of FIG. 2A.
Figure 2D:
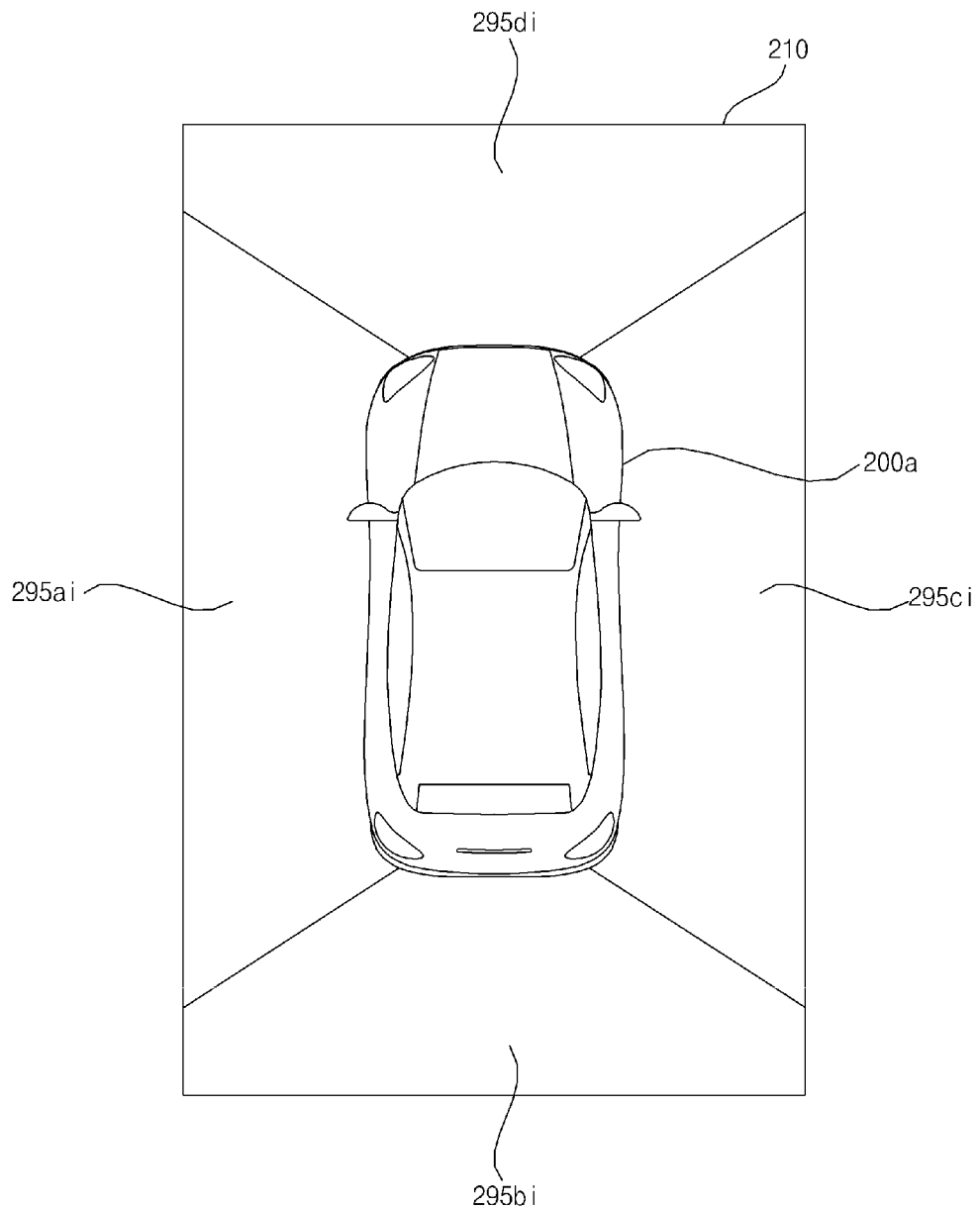
FIG. 2D is a view showing an example of an around view image based on images captured by the plurality of cameras of FIG. 2C.

FIG. 2C is a schematic diagram showing positions of a plurality of cameras attached to the vehicle of FIG. 2A and FIG. 2D is a view showing an example of an around view image based on images captured by the plurality of cameras of FIG. 2C.

First, referring to FIG. 2C, the plurality of cameras 295*a*, 295*b*, 295*c*, and 295*d* may be arranged on left, rear, right, and front sides of the vehicle, respectively.

In particular, the left camera 295*a* and the right camera 295*c* may be arranged in a case surrounding a left rear view mirror and a case surrounding a right rear view mirror, respectively.

The rear camera 295*b* and the front camera 295*d* may be arranged around a trunk switch and at an emblem or around the emblem, respectively.

The plurality of images captured by the plurality of cameras 295*a*, 295*b*, 295*c*, and 295*d* may be transmitted to the processor 270 (refer to FIG. 3C or 3D) or the like in the vehicle 200 and the processor 270 (refer to FIG. 3C or 3D) may combine the plurality of images to generate an around view image.

FIG. 2D illustrates an example of an around view image 210. The around view image 210 may include a first image region 295*ai* from the left camera 295*a*, a second image region 295*bi* from the rear camera 295*b*, a third image region 295*ci* from the right camera 295*c*, and a fourth image region 295*di* from the front camera 295*d*.

Figure 3A:
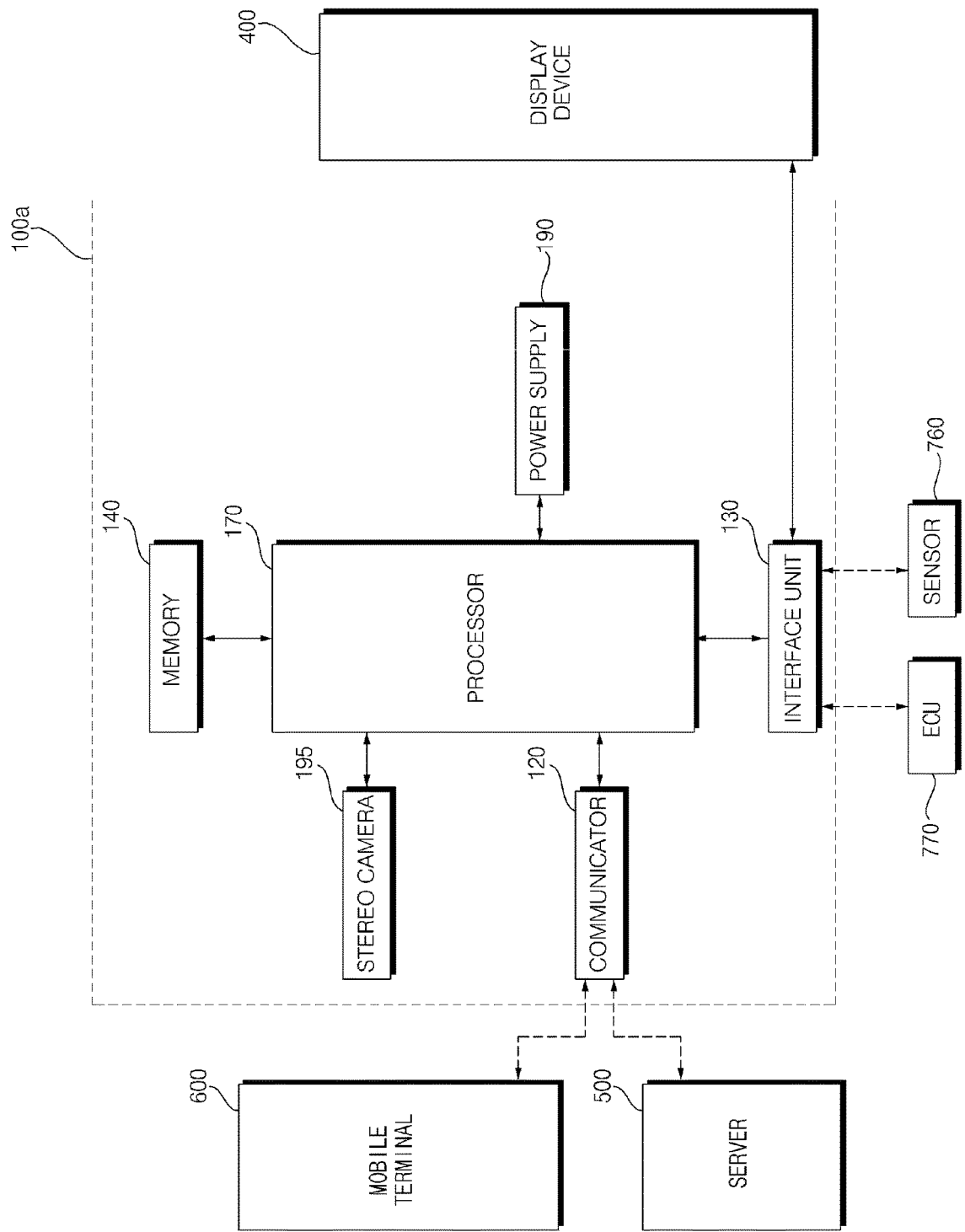
FIGS. 3A and 3B show internal block diagrams of various examples of the autonomous driving device of FIG. 1.
Figure 3B:
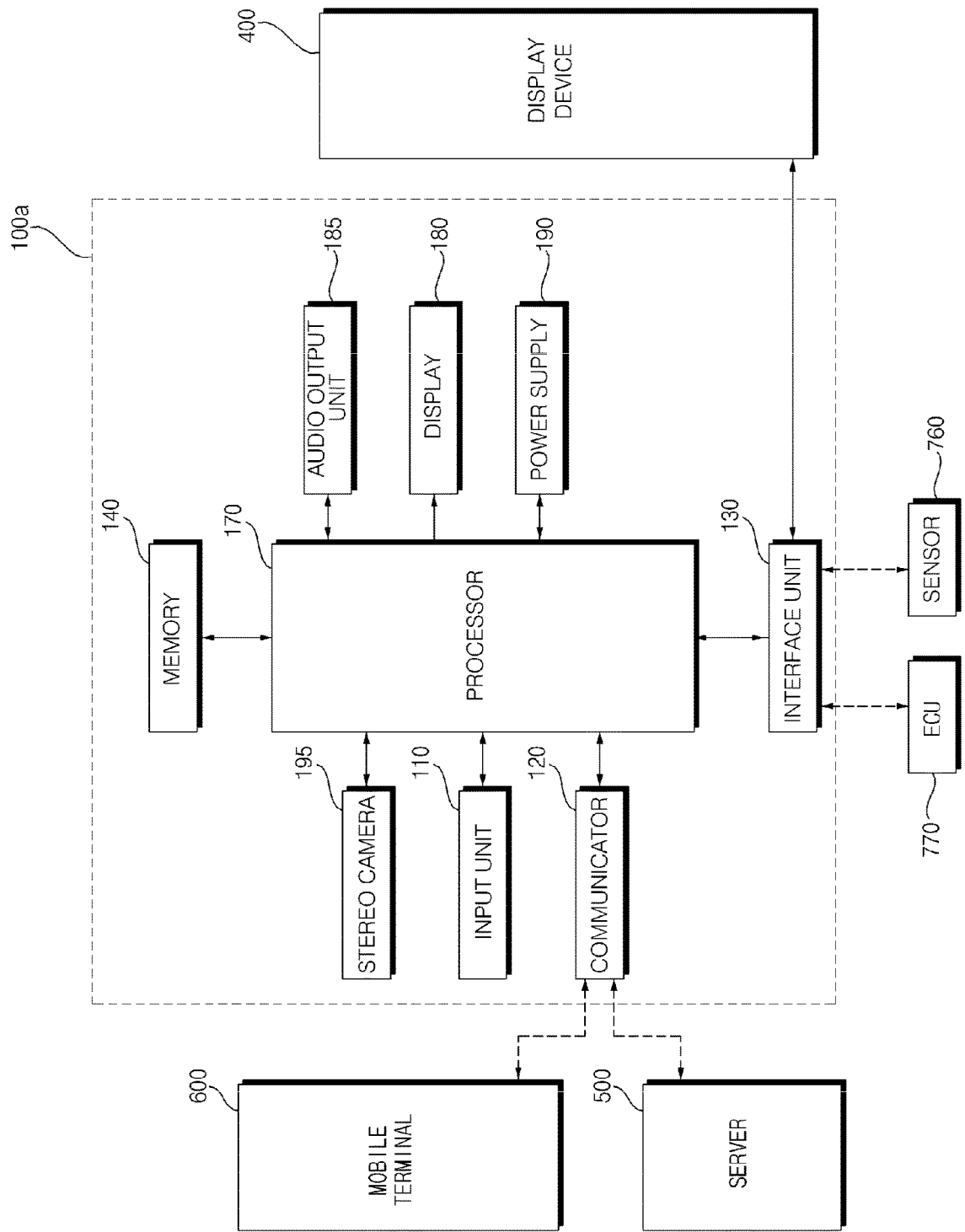

FIGS. 3A and 3B show internal block diagrams of various examples of the autonomous driving device of FIG. 1.

FIGS. 3A and 3B show internal block diagrams of examples of the vehicle driving auxiliary device 100*a* of the autonomous driving device 100.

The vehicle driving auxiliary device 100*a* may signal-process a stereo image received from the stereo camera 195 based on computer vision to generate vehicle related information. Here, the vehicle related information may include vehicle control information for direct control of a vehicle or vehicle driving auxiliary information for driver guidance for a vehicle driver.

First, referring to FIG. 3A, the vehicle driving auxiliary device 100*a* of FIG. 3A may include a communicator 120, an interface unit 130, a memory 140, a processor 170, a power supply 190, and the stereo camera 195.

The communicator 120 may wirelessly exchange data with the mobile terminal 600 or the server 500. In particular, the communicator 120 may wirelessly exchange data with a mobile terminal of a vehicle driver. A wireless data communication method may include various data communication methods such as Bluetooth, Wi-Fi Direct, Wi-Fi, and APiX.

The communicator 120 may receive transport protocol experts group (TPEG) information, for example, weather information and traffic situation information from the mobile terminal 600 or the server 500. The vehicle driving auxiliary device 100*a* may transmit real time traffic information recognized based on a stereo image to the mobile terminal 600 or the server 500.

When a user gets in a vehicle, the mobile terminal 600 of the user and the vehicle driving auxiliary device 100*a* may be paired with each other automatically or by executing an application of the user.

The interface unit 130 may receive vehicle related data or may externally transmit a signal processed or generated by the processor 170. To this end, the interface unit 130 may data-communicate with an electronic control unit (ECU)

770, an audio video navigation (AVN) device 400, a sensor 760, and so on in the vehicle using a wired or wireless communication method.

The interface unit 130 may receive map information related to a vehicle via data communication with the vehicle display device 400.

The interface unit 130 may receive sensor information from the ECU 770 or the sensor 760.

The sensor information may include at least one of vehicle direction information, vehicle position information (global positioning system (GPS) information), vehicle angle information, vehicle speed information, vehicle acceleration information, vehicle inclination information, vehicle forward/backward movement information, battery information, fuel information, tire information, vehicle lamp information, vehicle internal temperature information, or vehicle internal humidity information.

The sensor information may be acquired from a heading sensor, a yaw sensor, a gyro sensor, a position module, a vehicle forward/backward movement sensor, a wheel sensor, a vehicle speed sensor, a vehicle body inclination detection sensor, a battery sensor, a fuel sensor, a tire sensor, a steering sensor via steering wheel rotation, a vehicle internal temperature sensor, a vehicle internal humidity sensor, and so on. The position module may include a GPS module for receiving GPS information.

The vehicle direction information, the vehicle position information, the vehicle angle information, the vehicle speed information, the vehicle inclination information, and so on of the sensor information, which are related to vehicle driving, may be referred to as vehicle driving information.

The memory 140 may store a program for processing or control of the processor 170 or various data for an overall operation of the vehicle driving auxiliary device 100a.

An audio output unit (not shown) may convert an electrical signal from the processor 170 into an audio signal and output the audio signal. To this end, the audio output unit may include a speaker or the like. The audio output unit (not shown) may output sound corresponding to an operation of an input unit 110, i.e., a button.

The audio input unit (not shown) may receive user voice. To this end, the audio input unit may include a microphone. The received voice may be converted into an electrical signal and transmitted to the processor 170.

The processor 170 may control an overall operation of each unit in the vehicle driving auxiliary device 100a.

In particular, the processor 170 may perform signal processing based on computer vision. Accordingly, the processor 170 may acquire a stereo image of a front side of a vehicle from the stereo camera module 195, perform disparity calculation based on the stereo image, detect an object in at least one stereo image based on calculated disparity information, and continuously track movement of the object after the object is detected.

In particular, the processor 170 may perform lane detection, surrounding vehicle detection, pedestrian detection, traffic sign detection, road surface detection, and so on when the object is detected.

The processor 170 may calculate a distance from a detected surrounding vehicle, calculate speed of the detected surrounding vehicle, or calculate a speed difference from the detected surrounding vehicle.

The processor 170 may receive transport protocol experts group (TPEG) information, for example, weather information and traffic situation information through the communicator 120.

The processor 170 may recognize vehicle surrounding traffic situation information recognized based on a stereo image by the vehicle driving auxiliary device 100a, in real time.

The processor 170 may receive map information and so on from the vehicle display device 400 through the interface unit 130.

The processor 170 may receive sensor information from the ECU 770 or the sensor 760 through the interface unit 130. Here, the sensor information may include at least one of vehicle direction information, vehicle position information (GPS information), vehicle angle information, vehicle speed information, vehicle acceleration information, vehicle inclination information, vehicle forward/backward movement information, battery information, fuel information, tire information, vehicle lamp information, vehicle internal temperature information, or vehicle internal humidity information.

The power supply 190 may supply power required for an operation of each component under control of the processor 170. In particular, the power supply 190 may receive power from a battery or the like in the vehicle.

The stereo camera 195 may include a plurality of cameras. Hereinafter, as described above with reference to FIG. 2B and so on, the stereo camera 195 may include two cameras.

The stereo camera 195 may be detachably installed on a ceiling or windshield of the vehicle 200 and may include the first camera 195a including the first lens 193a and the second camera 195b including the second lens 193b.

The stereo camera 195 may include the first light shield 192a and the second light shield 192b, for shielding light incident on the first lens 193a and the second lens 193b, respectively.

Then, referring to FIG. 3B, the vehicle driving auxiliary device 100a of FIG. 3B may further include the input unit 110, a display 180, and an audio output unit 185 based on the vehicle driving auxiliary device 100a of FIG. 3A. Hereinafter, only the input unit 110, the display 180, and the audio output unit 185 will be described.

The input unit 110 may include a plurality of buttons or a touchscreen attached to the vehicle driving auxiliary device 100a, in particular, the stereo camera 195. Through the plurality of buttons or the touchscreen, the vehicle driving auxiliary device 100a may be powered on to be operated. In addition, the vehicle driving auxiliary device 100a may perform various input operations.

The display 180 may display an image related to an operation of a vehicle driving auxiliary device. To display the image, the display 180 may include a cluster or a head up display (HUD) installed on an internal front surface of a vehicle. When the display 180 is a HUD, the display 180 may include a projection module for projecting an image onto a windshield of the vehicle 200.

The audio output unit 185 may externally output sound based on an audio signal processed by the processor 170. To this end, the audio output unit 185 may include at least one speaker.

Figure 3C:
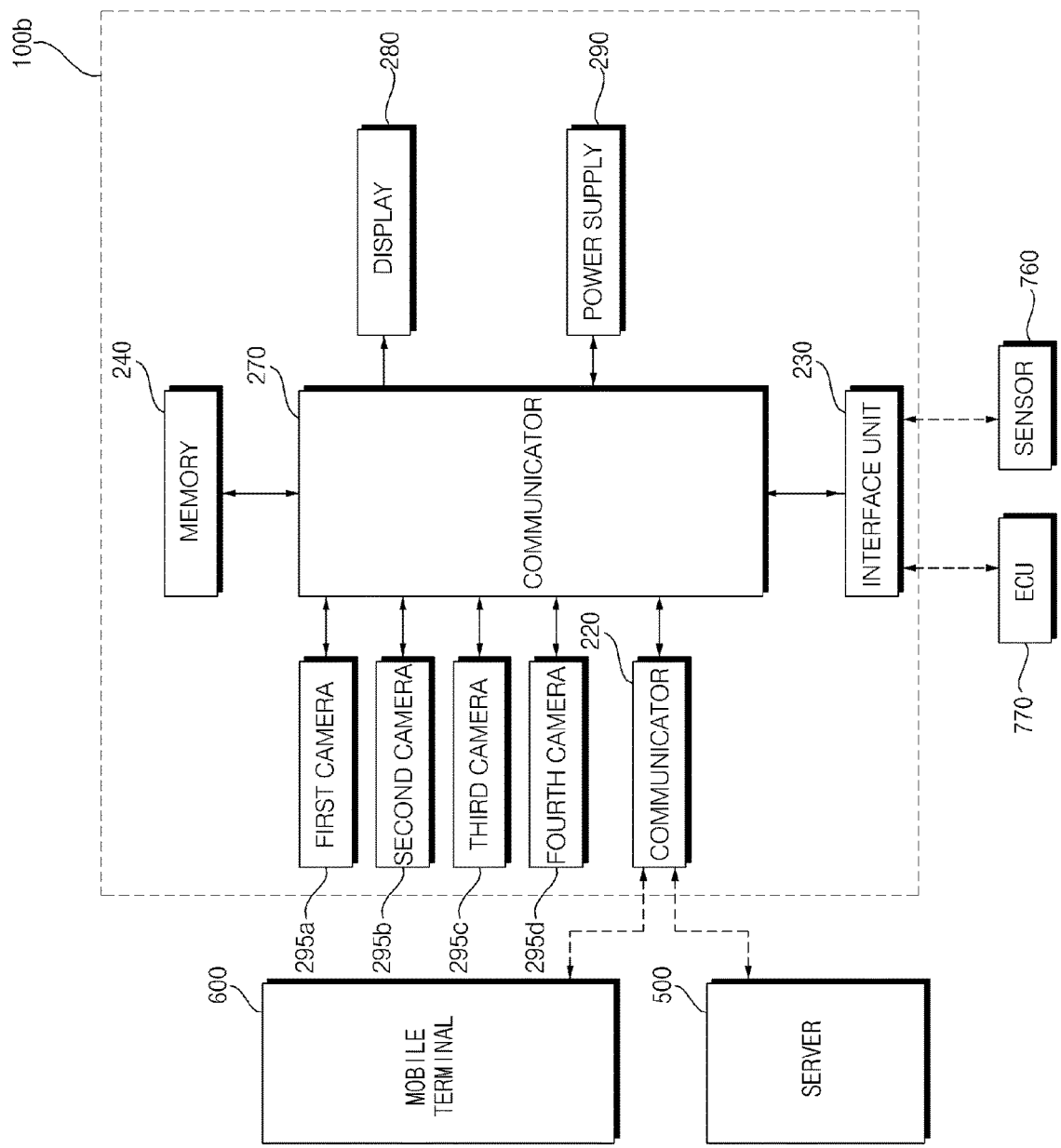

FIGS. 3C and 3D show internal blocks of various examples of the autonomous driving device of FIG. 1.

FIGS. 3C and 3D show internal blocks of examples of the around view providing device 100b of the autonomous driving device 100.

The around view providing device 100b of FIGS. 3C to 3D may combine a plurality of images received from a plurality of cameras 295a, . . . , 295d to generate an around view image.

The around view providing device 100b may detect, verify, and track an object positioned in the vicinity of a vehicle based on a plurality of images that are received from the plurality of cameras 295a, . . . , 295d, respectively.

First, referring to FIG. 3C, the around view providing device 100b of FIG. 3C may include a communicator 220, an interface unit 230, a memory 240, the processor 270, a display 280, a power supply 290, and the plurality of cameras 295a, . . . , 295d.

The communicator 220 may wirelessly exchange data with the mobile terminal 600 or the server 500. In particular, the communicator 220 may wirelessly exchange data with a mobile terminal of a vehicle driver. A wireless data communication method may include various data communication methods such as Bluetooth, Wi-Fi Direct, Wi-Fi, and APiX.

The communicator 220 may receive transport protocol experts group (TPEG) information, for example, schedule information related to a schedule time of a vehicle driver or a movement position, weather information, and road traffic situation information, from the mobile terminal 600 or the server 500. The around view providing device 100b may transmit real time traffic information recognized based on an image to the mobile terminal 600 or the server 500.

When a user gets in a vehicle, the mobile terminal 600 of the user and the around view providing device 100b may be paired with each other automatically or by executing an application of the user.

The interface unit 230 may receive vehicle related data or may externally transmit a signal processed or generated by the processor 270. To this end, the interface unit 230 may data-communicate with the ECU 770, the sensor 760, and so on in the vehicle using a wired or wireless communication method.

The interface unit 230 may receive sensor information from the ECU 770 or the sensor 760.

Here, the sensor information may include at least one of vehicle direction information, vehicle position information (GPS information), vehicle angle information, vehicle speed information, vehicle acceleration information, vehicle inclination information, vehicle forward/backward movement information, battery information, fuel information, tire information, vehicle lamp information, vehicle internal temperature information, or vehicle internal humidity information.

The vehicle direction information, the vehicle position information, the vehicle angle information, the vehicle speed information, the vehicle inclination information, and so on of the sensor information, which are related to vehicle driving, may be referred to as vehicle driving information.

The memory 240 may store a program for processing or control of the processor 270 or various data for an overall operation of the around view providing device 100b.

The memory 240 may store map information related to vehicle driving.

The processor 270 may control an overall operation of each unit in the around view providing device 100b.

In particular, the processor 270 may acquire a plurality of images from the plurality of cameras 295a, . . . , 295d and combine the plurality of images to generate an around view image.

The processor 270 may perform signal processing based on computer vision. For example, the processor 270 may perform disparity calculation on surroundings of a vehicle based on the plurality of images or the generated around view image, detect an object from the image based on the calculated disparity information, and continuously track movement of the object after the object is detected.

In particular, the processor 270 may perform lane detection, surrounding vehicle detection, pedestrian detection, obstacle detection, parking area detection, road surface detection, and so on when the object is detected.

The processor 270 may calculate a distance from a detected surrounding vehicle or pedestrian.

The processor 270 may receive sensor information from the ECU 770 or the sensor 760 through the interface unit 230. Here, the sensor information may include at least one of vehicle direction information, vehicle position information (GPS information), vehicle angle information, vehicle speed information, vehicle acceleration information, vehicle inclination information, vehicle forward/backward movement information, battery information, fuel information, tire information, vehicle lamp information, vehicle internal temperature information, or vehicle internal humidity information.

The display 280 may display the around view image generated by the processor 270. During display of the around view image, various user interface units may be provided and a touch sensor for enabling touch input with respect to the provided user interface unit may be provided.

The display 280 may include a cluster or a head up display (HUD) installed on an internal front surface of a vehicle. When the display 280 is a HUD, the display 280 may include a projection module for projecting an image onto a windshield of the vehicle 200.

The power supply 290 may supply power required for an operation of each unit under control of the processor 270. In particular, the power supply 290 may receive power from a battery or the like in the vehicle.

The plurality of cameras 295a, . . . , 295d may be a camera for providing an around view image and may be a wide-angle camera.

Then, referring to FIG. 3D, the around view providing device 100b of FIG. 3D may be similar to the around view providing device 100b of FIG. 3C but is different therefrom in that the around view providing device 100b of FIG. 3D may further include an input unit 210, an audio output unit 285, and an audio input unit 286. Hereinafter, only the input unit 210, the audio output unit 285, and the audio input unit 286 will be described.

The input unit 210 may include a plurality of buttons attached to surroundings of the display 280 or a touchscreen arranged on the display 280. The around view providing device 100b may be powered on through the plurality of buttons or the touchscreen to be operated. In addition, the around view providing device 100b may perform various input operations.

The audio output unit 285 may convert an electrical signal from the processor 270 into an audio signal and output the audio signal. To this end, the audio output unit 285 may include a speaker or the like. The audio output unit 285 may output sound corresponding to an operation of the input unit 210, i.e., a button.

The audio input unit 286 may receive user voice. To this end, the audio input unit 286 may include a microphone. The received voice may be converted into an electrical signal and transmitted to the processor 270.

The around view providing device 100b of FIG. 3C or 3D may be an audio video navigation (AVN) device.

Figure 3E:
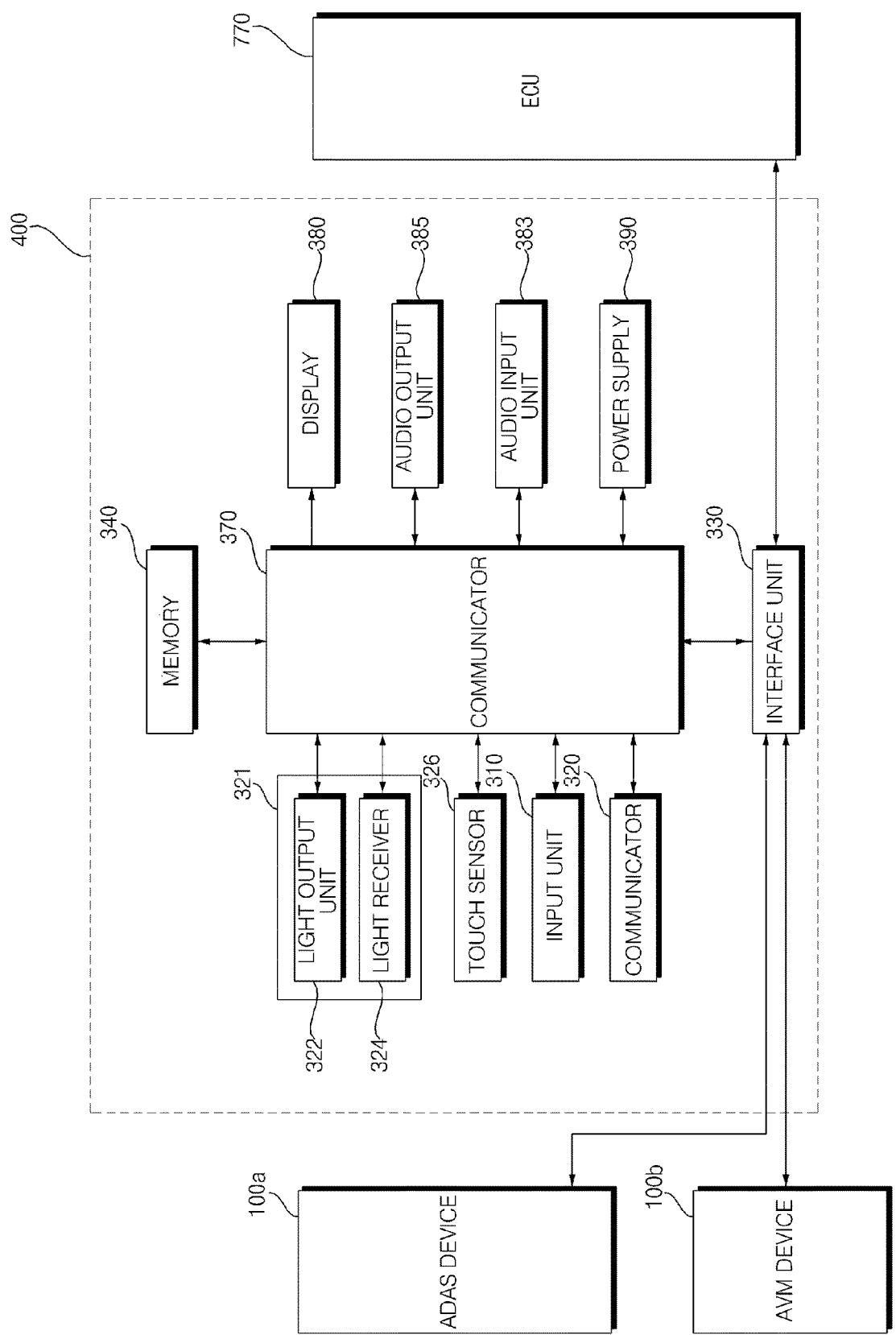
FIG. 3E is an internal block diagram of the vehicle display device of FIG. 1.

FIG. 3E is an internal block diagram of the vehicle display device of FIG. 1.

Referring to the drawing, the vehicle display device 400 according to an embodiment of the present invention may include an input unit 310, a communicator 320, a space recognition sensor 321, a touch sensor 326, an interface unit 330, a memory 340, a processor 370, a display 480, an audio input unit 383, an audio output unit 385, and a power supply 390.

The input unit 310 may include a button attached to the display device 400. For example, the input unit 310 may include a power button. In addition, the input unit 310 may further include at least one of a menu button, an up and down adjustment button, or a right and left adjustment button.

An input signal input through the input unit 310 may be transmitted to the processor 370.

The communicator 320 may exchange data with an adjacent electronic device. For example, an electronic device in a vehicle or a server (not shown) may wirelessly exchange data. In particular, the communicator 320 may wirelessly exchange data with a mobile terminal of a vehicle driver. A wireless data communication method may include various data communication methods such as Bluetooth, Wi-Fi, and APiX.

For example, when a user gets in a vehicle, a mobile terminal of the user and the display device 400 may be paired with each other automatically or by executing an application of the user.

The communicator 320 may include a GPS reception device and may receive GPS information, i.e., positional information of a vehicle, through the GPS reception device.

The space recognition sensor 321 may detect approach or movement of a user hand. To this end, the space recognition sensor 321 may be arranged around the display 480.

The space recognition sensor 321 may recognize a space based on light or recognize a space based on ultrasonic waves. Hereinafter, embodiments of the present invention will be described in terms of space recognition based light.

The space recognition sensor 321 may detect approach or movement of a user hand based on output of output light or reception of received light corresponding thereto. In particular, the processor 370 may signal-process an electrical signal of output light and received light.

To this end, the space recognition sensor 321 may include a light output unit 322 and a light receiver 324.

The light output unit 322 may output, for example, infrared (IR) light to detect a user hand positioned in front of the display device 400.

The light receiver 324 may receive scattered or reflected light when light output from the light output unit 322 is scattered or reflected by a user hand positioned in front of the display device 400. In detail, the light receiver 324 may include a photodiode and convert received light into an electrical signal through the photodiode. The converted electrical signal may be input to the processor 370.

The touch sensor 326 may detect floating touch or direct touch. To this end, the touch sensor 326 may include an electrode array, an MCU, and so on. When the touch sensor is operated, an electrical signal may be applied to the electrode array to form an electric field on the electrode array.

The touch sensor 326 may be operated when intensity of light received by the space recognition sensor 321 is equal to or greater than a first level.

That is, when a user hand or the like approaches within a predetermined distance, an electrical signal may be applied to the electrode array or the like in the touch sensor 326. An electric field may be formed on the electrode array by the electrical signal applied to the electrode array and capacitance change may be detected using the electric field. Based on detection of capacitance change, floating touch and direct touch may be detected.

In particular, x-axis information other than x and y information may be detected along with approach of a user hand through the touch sensor 326.

The interface unit 330 may exchange data with another electronic device in a vehicle. For example, the interface unit 330 may data-communicate with an ECU or the like in the vehicle using a wired communication method.

In detail, the interface unit 330 may receive vehicle state information via data communication with an ECU or the like in the vehicle.

Here, the vehicle state information may include at least one of battery information, fuel information, vehicle speed information, tire information, steering information via steering wheel rotation, vehicle lamp information, vehicle internal temperature information, vehicle external temperature information, or vehicle internal humidity information.

The interface unit 330 may additionally receive GPS information from an ECU in the vehicle. In addition, the interface unit 330 may transmit GPS information received from the display device 400 to an ECU or the like.

The memory 340 may store a program for processing or control of the processor 370 or various data for an overall operation of the display device 400.

For example, the memory 340 may store map information for guidance of a driving path of a vehicle.

As another example, the memory 340 may store user information and mobile terminal information of a user for pairing with a mobile terminal of a user.

The audio output unit 385 may convert an electrical signal from the processor 370 into an audio signal and output the audio signal. To this end, the audio output unit 385 may include a speaker or the like. The audio output unit 385 may output sound corresponding to the input unit 310, i.e., a button.

The audio input unit 383 may receive user voice. To this end, the audio input unit 383 may include a microphone. The received voice may be converted into an electrical signal and transmitted to the processor 370.

The processor 370 may control an overall operation of each unit in the vehicle display device 400.

When a user hand continuously approaches the display device 400, the processor 370 may continuously calculate x, y, and z axis information of a user hand based on light received by the light receiver 324. In this case, z axis information may be sequentially lowered.

When a user hand approaches within a second distance closer to the display 480 than a first distance, the processor 370 may control the touch sensor 326 to be operated. That is, the processor 370 may control the touch sensor 326 to be operated when intensity of an electrical signal from the space recognition sensor 321 is equal to or greater than a reference level. Accordingly, the electrical signal may be applied to each electrode array in the touch sensor 326.

When a user hand is positioned within the second distance, the processor 370 may detect a floating touch based on a sensing signal sensed by the touch sensor 326. In particular, the sensing signal may be a signal indicating capacitance change.

The processor 370 may calculate x and y axis information of floating touch input based on the sensing signal and calculate z axis information as a distance between a user hand and the display device 400 based on an intensity of capacitance change.

The processor 370 may vary grouping of an electrode array in the touch sensor 326 according to a distance from a user hand.

In detail, the processor 370 may vary grouping of an electrode array in the touch sensor 326 based on approximate z axis information calculated based on light received by the space recognition sensor 321. The processor 370 may perform setting in such a way that, as the distance is increased, a size of an electrode array group is further increased.

That is, the processor 370 may vary a size of a touch detection cell with respect to the electrode array in the touch sensor 326 based on distance information of a user hand, i.e., z axis information.

The display 480 may separately display an image corresponding to a function set to a button. To display the image, the display 480 may be embodied as various display modules such as a liquid crystal display (LCD) or an organic light emitting diode (OLED) display. The display 480 may be embodied as a cluster on a windshield in the vehicle.

The power supply 390 may supply power required for an operation of each unit under control of the processor 370.

Figure 4A:
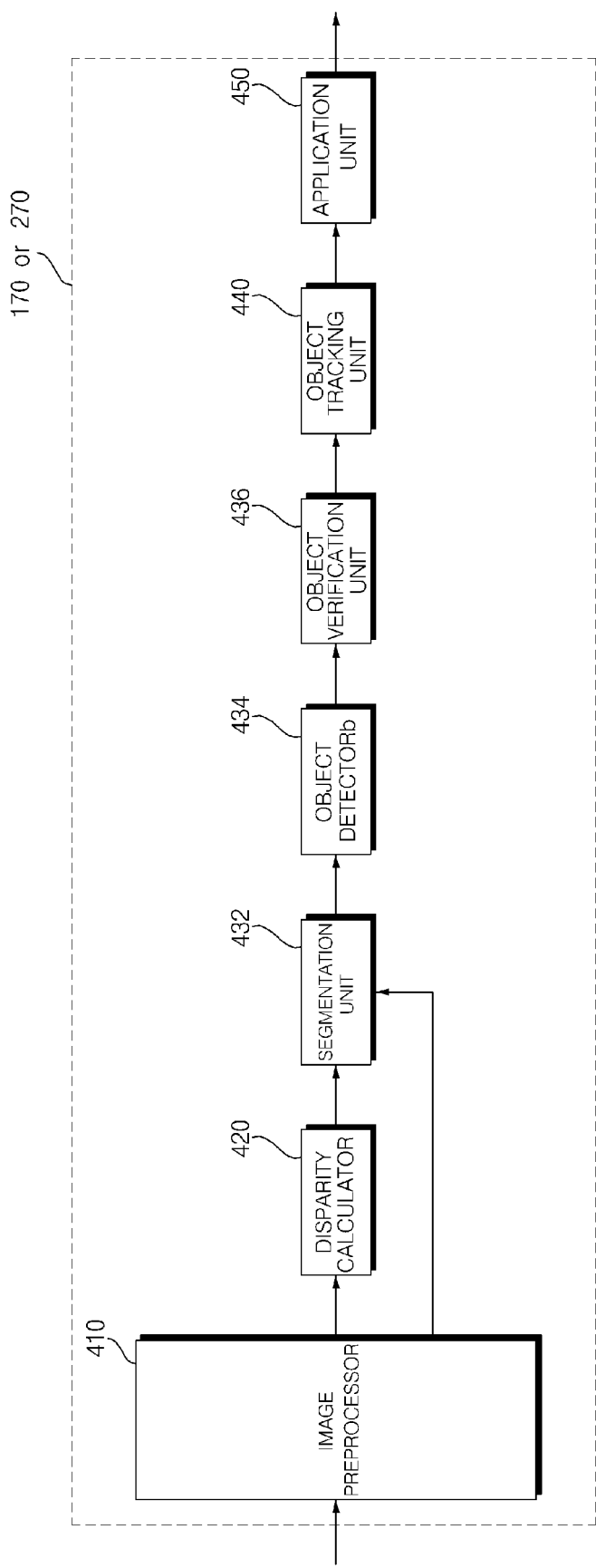
FIGS. 4A and 4B show internal block diagrams of various examples of the processor of FIGS. 3A to 3D.
Figure 4B:
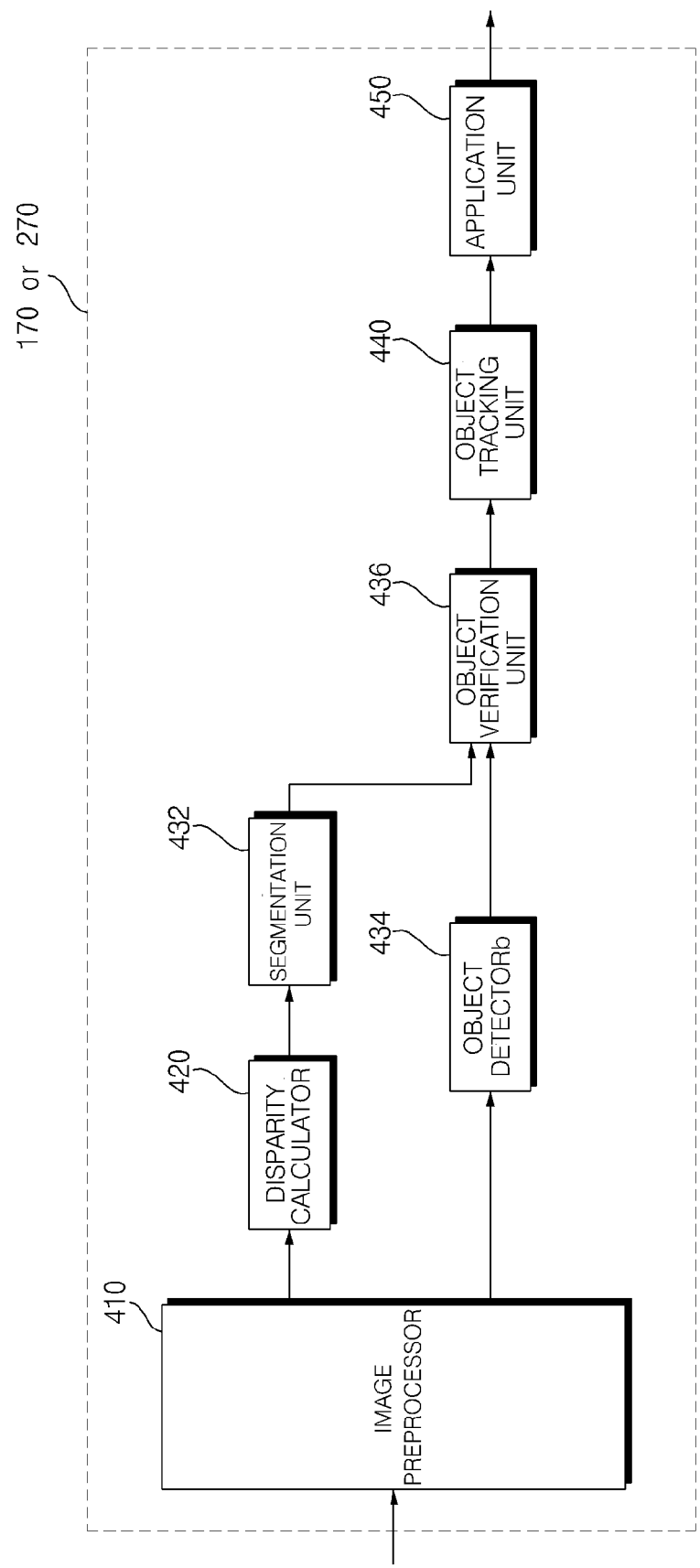
Figure 5A:
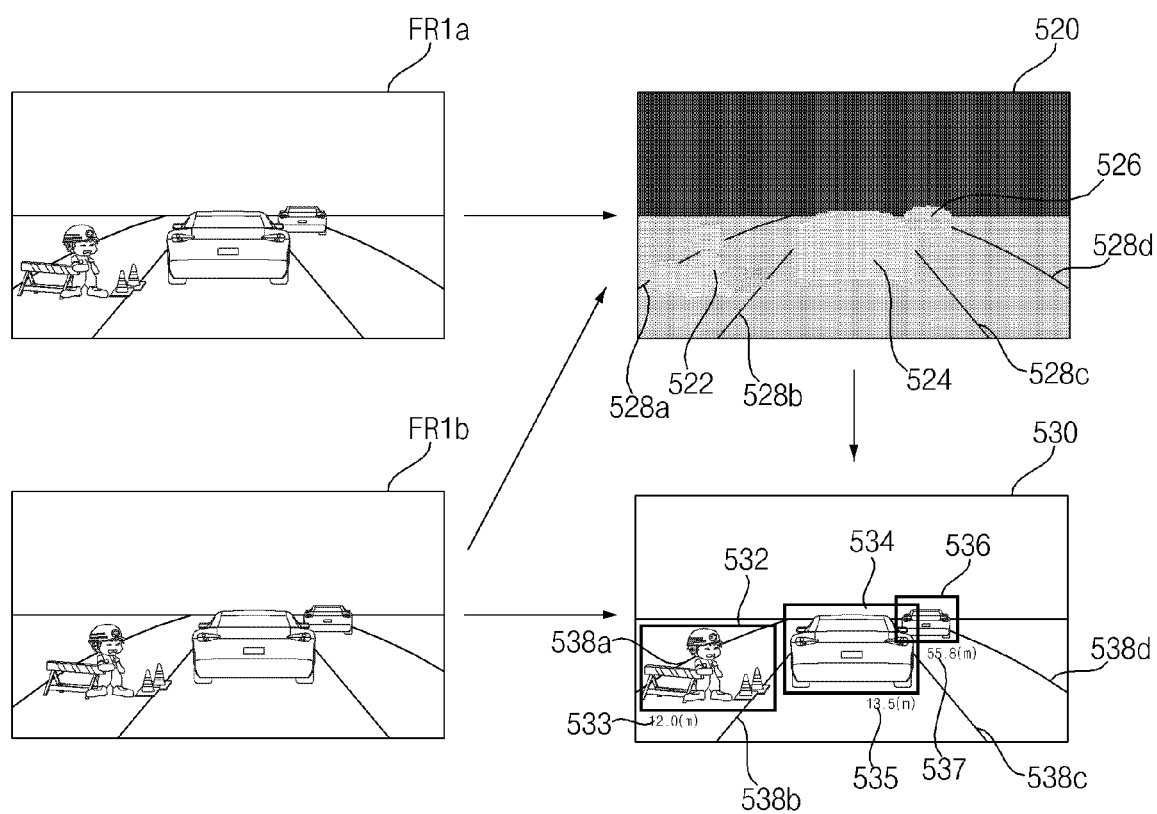
FIGS. 5A and 5B are diagrams showing an example of object detection of the processor of FIGS. 4A and 4B.
Figure 5B:
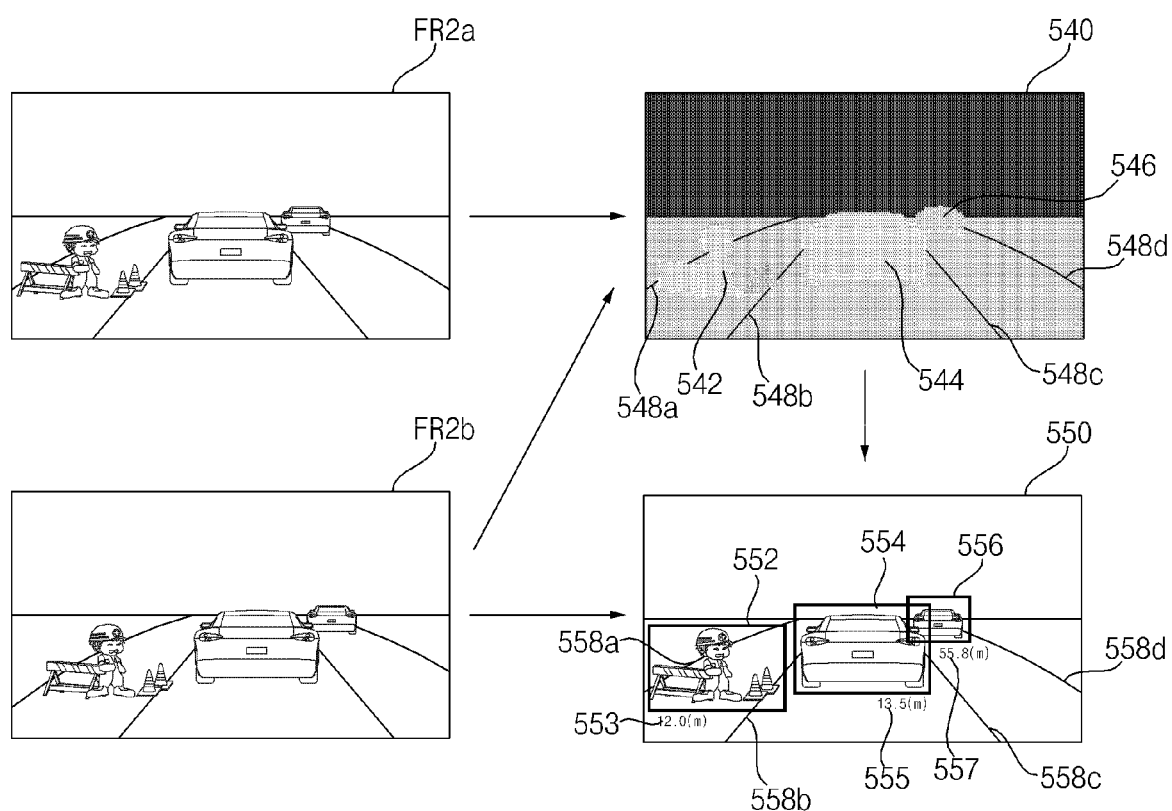

FIGS. 4A and 4B show internal block diagrams of various examples of the processor of FIGS. 3A to 3D. FIG. 5 is a diagram showing an example of object detection of the processor of FIGS. 4A and 4B.

First, FIG. 4A shows an internal block diagram of an example of the processor 170 of the vehicle driving auxiliary device 100a of FIGS. 3A and 3B or the processor 270 of the around view providing device 100b of FIGS. 3C and 3D.

The processor 170 or 270 may include an image preprocessor 410, a disparity calculator 420, an object detector 434, an object tracking unit 440, and an application unit 450.

The image preprocessor 410 may receive the plurality of images or the generated around view image from the plurality of cameras 295a, . . . , 295d and perform preprocessing.

In detail, the image preprocessor 410 may perform noise reduction, rectification, calibration, color enhancement, color space conversion (CSC), interpolation, camera gain control, or the like on the plurality of images or the generated around view image. Accordingly, a clearer image than the generated around view image or the plurality of images captured by the plurality of cameras 295a, . . . , 295d may be acquired.

The disparity calculator 420 may receive the plurality of images or the generated around view image, signal-processed by the image preprocessor 410, perform stereo matching on the plurality of images that are sequentially received for a predetermined time or the generated around view image, and acquire a disparity map according to stereo matching. That is, the disparity calculator 420 may acquire display information of surroundings of a vehicle.

In this case, stereo matching may be performed in units of pixels of images or predetermined bocks. The disparity map may refer to a map that numerically indicates binocular parallax information of an image, i.e., right and left images.

A segmentation unit 432 may perform segmentation and clustering on an image based on the disparity information from the disparity calculator 420.

In detail, the segmentation unit 432 may divide at least one image into a background and a foreground based on the disparity information.

For example, in the disparity map, a region with disparity information that is equal to or less than a predetermined value may be calculated as the background and the corresponding region may be excluded. As such, the relative foreground may be separated.

As another example, in the disparity map, a region with disparity information that is equal to or greater than the predetermined value may be calculated as the foreground and the corresponding region may be extracted. As such, the foreground may be separated.

As such, the foreground and the background may be separated based on disparity information extracted based on an image and, thus, signal processing speed, signal processing amount, and so on may be reduced during subsequent object detection.

Then, the object detector 434 may detect an object based on image segmentation from the segmentation unit 432.

That is, the object detector 434 may detect an object in at least one of images based on the disparity information.

In detail, the object detector 434 may detect an object in at least one of images. For example, an object may be detected from a foreground extracted via image segmentation.

Then, an object verification unit 436 may classify and verify the extracted object.

To this end, the object verification unit 436 may use an identification scheme using a neural network, a support vector machine (SVM) scheme, an identification scheme via AdaBoost using Haar-like features, a histograms of oriented gradients (HOG) scheme, or the like.

The object verification unit 436 may compare objects stored in the memory 240 with the detected object to verify an object.

For example, the object verification unit 436 may verify a surrounding vehicle, a lane, a road surface, a sign, a dangerous area, a tunnel, or the like, positioned around a vehicle.

The object tracking unit 440 may track the verified object. For example, the object tracking unit 440 may verify an object in sequentially acquired images, calculate movement of the verified object or a motion vector, and track movement of the corresponding object based on the calculated movement or motion vector. Accordingly, a surrounding vehicle, a lane, a road surface, a sign, a dangerous area, or the like, positioned around a vehicle, may be tracked.

FIG. 4B shows an internal block diagram of another example of a processor.

Referring to the drawing, the processor 170 or 270 of FIG. 4B has the same internal constituent units as the processor 170 or 270 of FIG. 4A but is different in terms of a signal processing order. Hereinafter, embodiments of the present invention will be described in terms of such difference.

The object detector 434 may receive the plurality of images or the generated around view image and detect an object in the plurality of images or the generated around view image. Differently from FIG. 4A, an object may not be detected from a segmented image based on disparity information but may be detected directly from the plurality of image or the generated around view image.

Then, the object verification unit 436 may classify and verify the detected and extracted object from the image segmentation from the segmentation unit 432 and the object detected by the object detector 434.

To this end, the object verification unit 436 may use an identification scheme using a neural network, a support vector machine (SVM) scheme, an identification scheme via AdaBoost using Haar-like features, a histograms of oriented gradients (HOG) scheme, or the like.

FIG. 5 is a diagram for explanation of an operating method of the processor 170 or 270 of FIGS. 4A and 4B based on images acquired in first and second frame sections, respectively.

Referring to FIG. 5, during the first and second frame sections, the plurality of cameras 295a, . . . , 295d may sequentially acquire images FR1a and FR1b.

The disparity calculator 420 in the processor 170 or 270 may receive the images FR1a and FR1b that are signal-processed by the image preprocessor 410 and perform stereo matching on the received images FR1a and FR1b to acquire a disparity map 520.

The disparity map 520 may be obtained by leveling binocular parallax between the images FR1a and FR1b and may perform calculation in such a way that, as a disparity level is increased, a distance from a vehicle is calculated to be close and, as a disparity level is reduced, the distance from the vehicle is calculated to be far.

When the disparity map is displayed, as a disparity level is increased, brightness may be high and, as a disparity level is reduced, brightness may be low.

The drawing shows an example in which first to fourth lanes 528a, 528b, 528c, and 528d, and the like have respective disparity levels corresponding thereto and a construction zone 522, a first front vehicle 524, and a second front vehicle 526 have respective disparity levels corresponding thereto in the disparity map 520.

The segmentation unit 432, the object detector 434, and the object verification unit 436 may perform segmentation, object detection, and object verification, respectively, on at least one of the images FR1a and FR1b based on the disparity map 520.

The drawing shows an example in which objection detection and verification are performed on the second image FR1b using the disparity map 520.

That is, an object, for example, first to fourth lanes 538a, 538b, 538c, and 538d, a construction zone 532, a first front vehicle 534, and a second front vehicle 536 may be detected and verified in an image 530.

An image may be continuously acquired and, thus, the object tracking unit 440 may track the verified object.

Figure 6A:
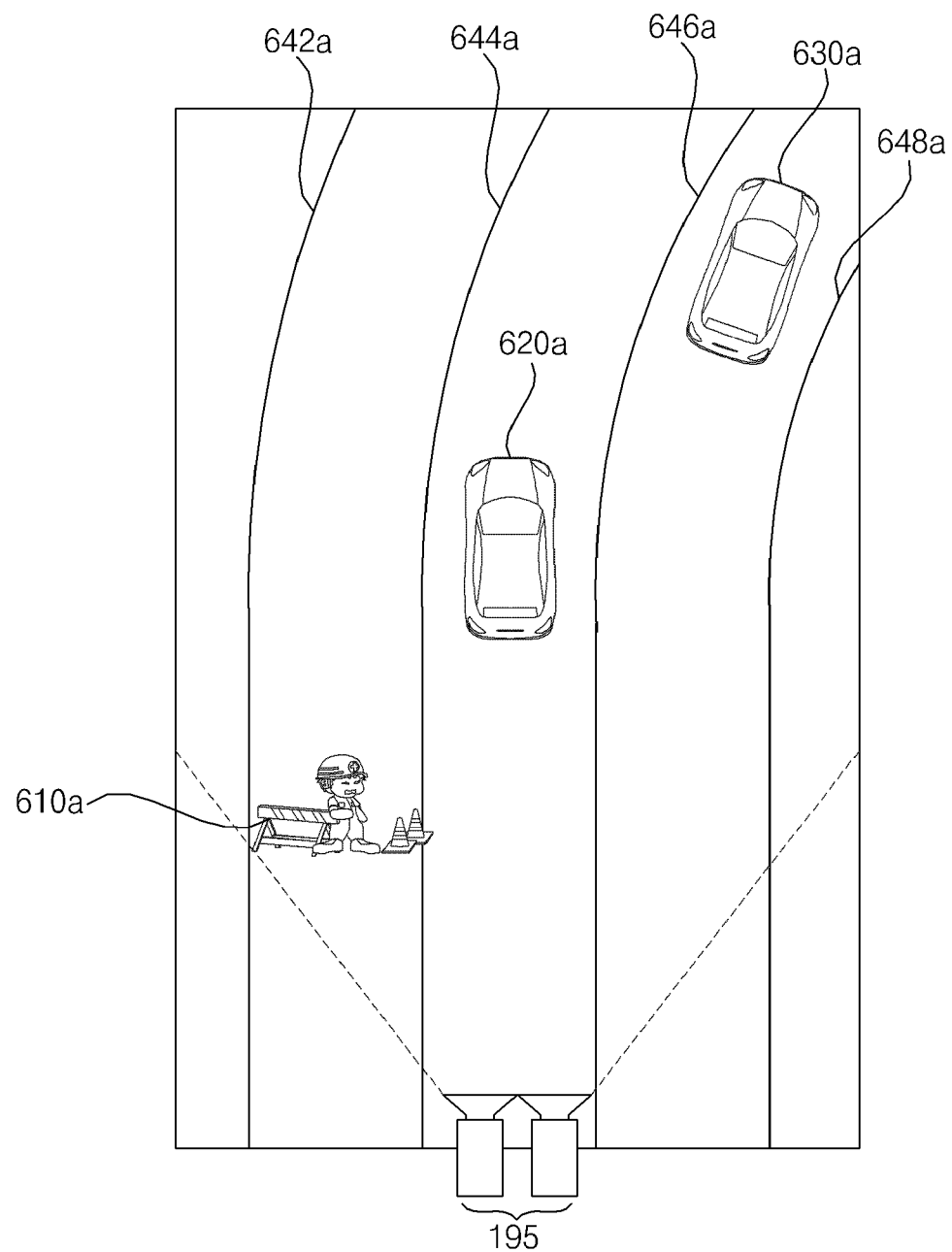
FIGS. 6A and 6B are diagrams for explanation of an operation of the autonomous driving device of FIG. 1.
Figure 6B:
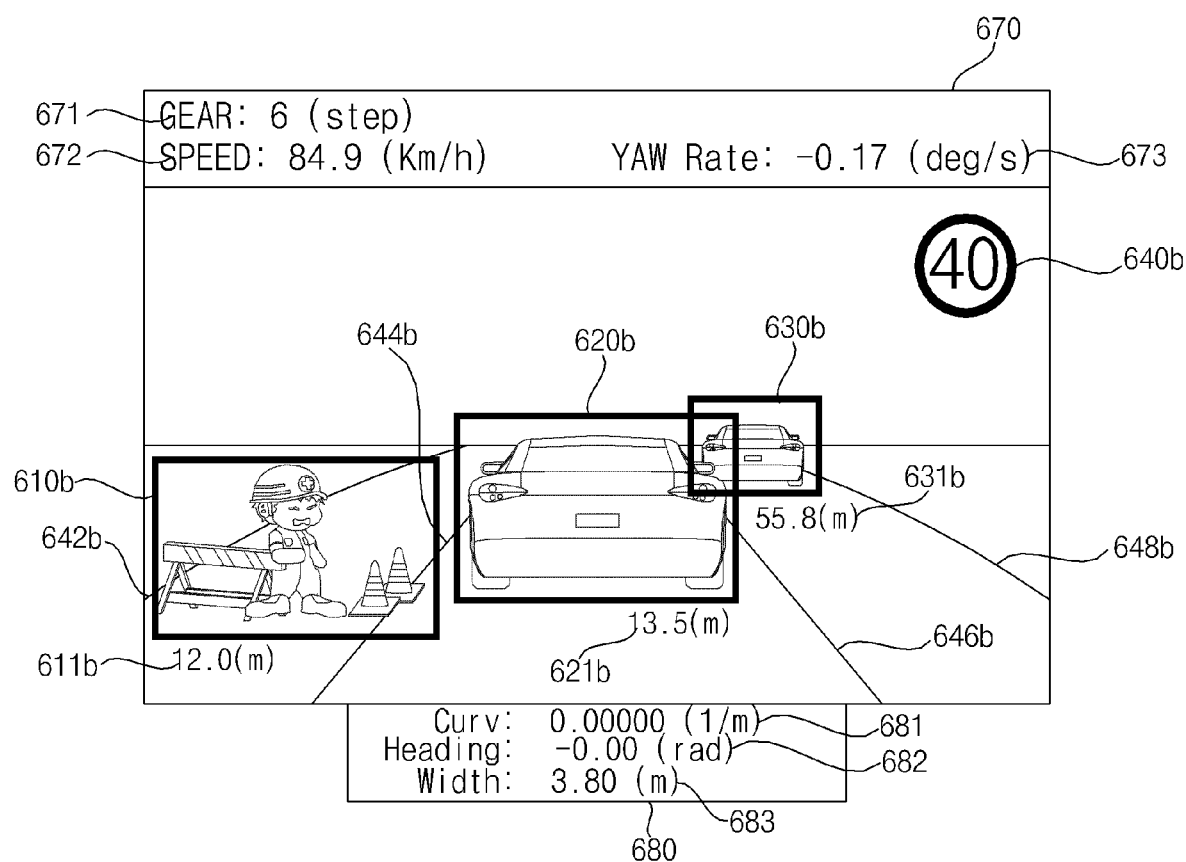

FIGS. 6A and 6B are diagrams for explanation of an operation of the autonomous driving device of FIG. 1.

First, FIG. 6A is a diagram showing an example of a vehicle front situation photographed by the stereo camera 195 included in a vehicle. In particular, the vehicle front situation may be displayed as a bird's eye view.

As seen from the drawing, a first lane 642a, a second lane 644a, a third lane 646a, and a fourth lane 648a may be viewed to the right from the left, a construction zone 610a may be positioned between the first lane 642a and the second lane 644a, a first front vehicle 620a may be positioned between the second lane 644a and the third lane 646a, and a second front vehicle 630a may be positioned between the third lane 646a and the fourth lane 648a.

Then, FIG. 6B shows an example in which a vehicle front situation recognized by a vehicle driving auxiliary device is displayed along with various information items. In particular, an image shown in FIG. 6B may be displayed on the display 180 or the vehicle display device 400 provided by the vehicle driving auxiliary device.

Differently from FIG. 6A, FIG. 6B shows an example in which information is displayed based on an image captured by the stereo camera 195.

As seen from the drawing, a first lane 642b, a second lane 644b, a third lane 646b, and a fourth lane 648b may be viewed to the right from the left, a construction zone 610b may be positioned between the first lane 642b and the second lane 644b, a first front vehicle 620b may be positioned between the second lane 644b and the third lane 646b, and a second front vehicle 630b may be positioned between the third lane 646b and the fourth lane 648b.

The vehicle driving auxiliary device 100a may perform signal processing based on a stereo image captured by the stereo camera 195 and verify an object such as the construction zone 610b, the first front vehicle 620b, and the second front vehicle 630b. In addition, the first lane 642b, the second lane 644b, the third lane 646b, and the fourth lane 648b may be verified.

The drawing illustrates an example in which edges are highlighted to indicate object verification of the construction zone 610b, the first front vehicle 620b, and the second front vehicle 630b.

The vehicle driving auxiliary device 100a may calculate distance information on the construction zone 610b, the first front vehicle 620b, and the second front vehicle 630b based on the stereo image captured by the stereo camera 195.

The drawing illustrates an example in which first distance information 611b, second distance information 621b, and third distance information 631b, which are calculated to correspond to the construction zone 610b, the first front vehicle 620b, and the second front vehicle 630b, respectively, are displayed.

The vehicle driving auxiliary device 100a may receive sensor information of a vehicle from the ECU 770 or the sensor 760. In particular, the vehicle driving auxiliary device 100a may receive vehicle speed information, gear information, yaw rate information indicating speed at which a rotation angle (yaw angle) of the vehicle is changed, and angle information of the vehicle and display these information items.

The drawing illustrates an example in which vehicle speed information 672, gear information 671, and yaw rate information 673 are displayed on an upper portion 670 of a vehicle front image and vehicle angle information 682 is displayed on a lower portion 680 of the vehicle front image or, alternatively, there may be various examples. In addition, vehicle width information 683 and road curvature information 681 may be displayed along with the vehicle angle information 682.

The vehicle driving auxiliary device 100a may receive speed limit information or the like of a road on which a vehicle travels through the communicator 120 or the interface unit 130. The drawing illustrates an example in which speed limit information 640b is displayed.

The vehicle driving auxiliary device 100a may display various information items shown in FIG. 6B through the display 180 or the like or, alternatively, various information items may be stored without display of various information items. In addition, various applications may be used using these information items.

Figure 7:
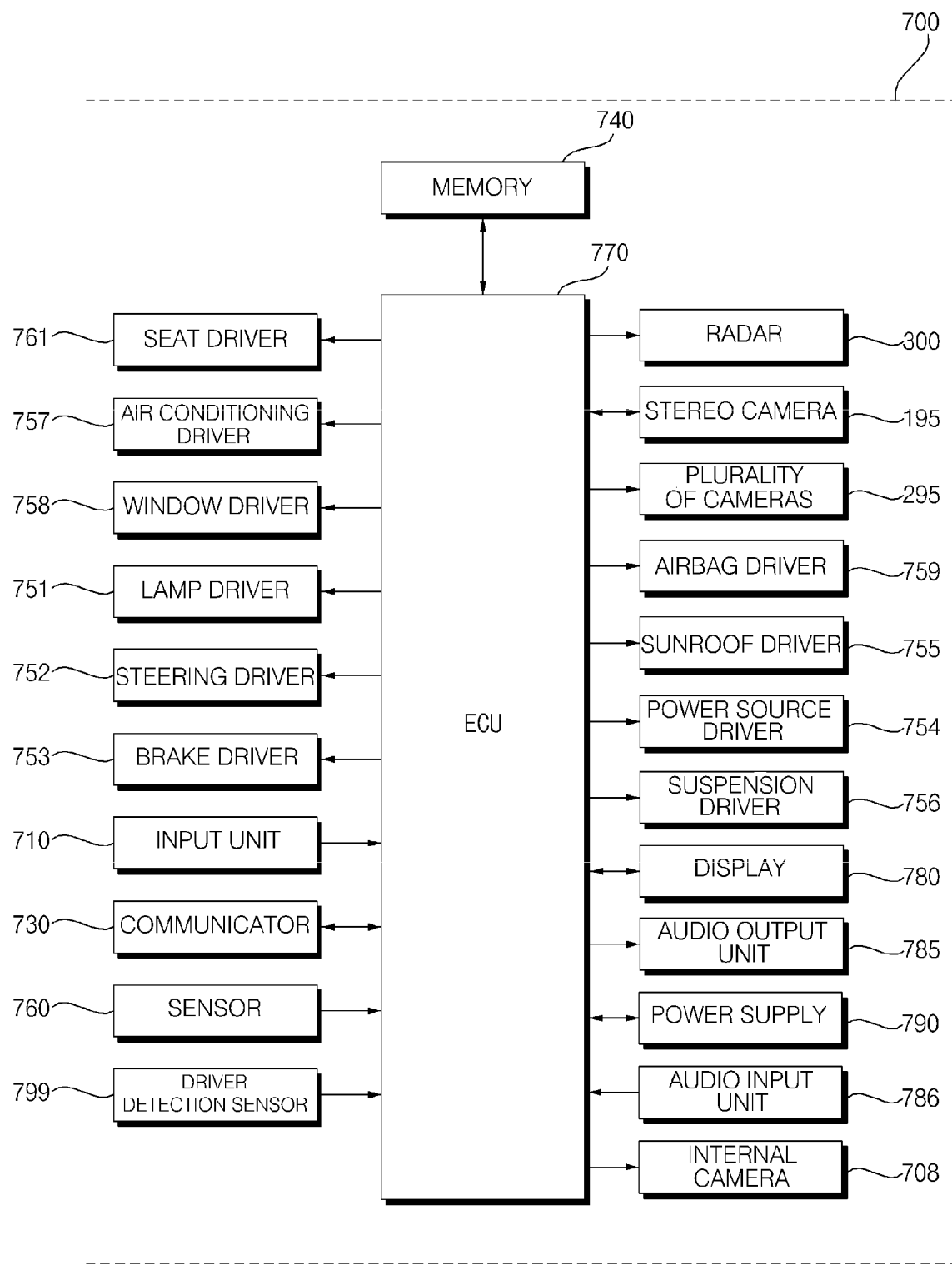
FIG. 7 is an internal block diagram of an example of a vehicle according to an embodiment of the present invention.

FIG. 7 is an internal block diagram of an example of a vehicle according to an embodiment of the present invention.

Referring to the drawing, the vehicle 200 may include an electronic control device 700 for vehicle control.

The electronic control device 700 may include an input unit 710, a communication unit 720, a memory 740, a lamp driver 751, a steering driver 752, a brake driver 753, a power source driver 754, a sunroof driver 755, a suspension driver 756, an air conditioning driver 757, a window driver 758, an airbag driver 759, the sensor 760, an ECU 770, a display 780, an audio output unit 785, an audio input unit 786, a power supply 790, the stereo camera 195, a plurality of cameras 295, the radar 300, an internal camera 708, a seat driver 761, and a driver detection sensor 799.

The ECU 770 may be interpreted as including the processor 270 described with reference to FIG. 3C or 3D. Alternatively, a separate processor for signal-processing an image from a camera may be included in addition to the ECU 770.

The input unit 710 may include a plurality of buttons or a touchscreen arranged in the vehicle 200. Various input operations may be performed through the plurality of buttons or the touchscreen.

The communication unit 720 may wirelessly exchange data with the mobile terminal 600 or the server 500. In particular, the communication unit 720 may wirelessly exchange data with a mobile terminal of a vehicle driver. A wireless data communication method may include various data communication methods such as Bluetooth, Wi-Fi Direct, Wi-Fi, and APiX.

The communication unit 720 may receive transport protocol experts group (TPEG) information, for example, schedule information related to a schedule time of a vehicle driver or a movement position, weather information, and road traffic situation information, from the mobile terminal 600 or the server 500.

When a user gets in a vehicle, the mobile terminal 600 of the user and the electronic control device 700 may be paired with each other automatically or by executing an application of the user.

The memory 740 may store a program for processing or control of the ECU 770 or various data for an overall operation of the electronic control device 700.

The memory 740 may store map information related to vehicle driving.

The lamp driver 751 may turn a lamp inside or outside a vehicle on/off. The lamp driver 751 may control intensity, direction, and so on of light of the lamp. For example, the lamp driver 751 may control a direction indication lamp, a brake lamp, and the like.

The steering driver 752 may perform electronic control of a steering apparatus (not shown) in the vehicle 200. To this end, the steering driver 752 may change a proceeding direction of the vehicle.

The brake driver 753 may perform electronic control of a brake apparatus (not shown) in the vehicle 200. For example, the brake driver 753 may control an operation of a brake arranged at a wheel to reduce speed of the vehicle 200. As another example, the brake driver 753 may change operation of brakes arranged at left and right wheels to adjust a proceeding direction of the vehicle 200 in a left or right direction.

The power source driver 754 may perform electronic control of a power source in the vehicle 200.

For example, when a fossil fuel-based engine (not shown) is a power source, the power source driver 754 may perform electronic control of the engine. As such, engine output torque or the like may be controlled.

As another example, when an electric motor (not shown) is a power source, the power source driver 754 may control a motor. As such, rotation speed, torque, and so on of the motor may be controlled.

The sunroof driver 755 may perform electronic control of a sunroof apparatus (not shown) in the vehicle 200. For example, opening or closing of a sunroof may be controlled.

The suspension driver 756 may perform electronic control of a suspension apparatus (not shown) in the vehicle 200. For example, when a road surface is curved, the suspension driver 756 may control the suspension apparatus to reduce vibration of the vehicle 200.

The air conditioning driver 757 may perform electronic control of an air conditioner (not shown) in the vehicle 200. For example, when temperature inside a vehicle is high, the air conditioner may be operated to supply cool air into the vehicle.

The window driver 758 may perform electronic control of a window apparatus (not shown) in the vehicle 200. For example, the window driver 758 may control opening or closing of right and left windows of a lateral surface of the vehicle.

The airbag driver 759 may perform electronic control of an airbag apparatus (not shown) in the vehicle 200. For example, in the case of danger, an airbag may be deployed.

The seat driver 761 may control a location of a seat or back of the vehicle 200. For example, when a driver sits on a driver seat, the driver seat, i.e., a front and rear interval of the seat, a front and rear interval of the back, and so on may be adjusted according to a corresponding driver.

The seat driver 761 may control a roller arranged in a seat or a back to provide a pressure like in a massager.

The sensor 760 may sense a signal related to driving or the like of the vehicle 200. To this end, the sensor 760 may include a heading sensor, a yaw sensor, a gyro sensor, a position module, a vehicle forward/backward movement sensor, a wheel sensor, a vehicle speed sensor, a vehicle body inclination detection sensor, a battery sensor, a fuel sensor, a tire sensor, a steering sensor via steering wheel rotation, a vehicle internal temperature sensor, a vehicle internal humidity sensor, or the like.

As such, the sensor 760 may acquire a sensing signal on vehicle direction information, vehicle position information, vehicle angle information, vehicle speed information, vehicle acceleration information, vehicle inclination information, vehicle forward/backward movement information, battery information, fuel information, tire information, vehicle lamp information, vehicle internal temperature information, vehicle internal humidity information, and so on.

In addition, the sensor 760 may further include an acceleration pedal sensor, a pressure sensor, an engine speed sensor, an engine air flow sensor (AFS), an air temperature sensor (ATS), a water temperature sensor (WTS), a throttle position sensor (TPS), a TDC sensor, a crank angle sensor (CAS), and so on.

The ECU 770 may control an overall operation of each unit in the electronic control device 700.

According to input of the input unit 710, the ECU 770 may perform a predetermined operation, receive a signal sensed by the sensor 760, transmit the signal to the around view providing device 100*b*, receive map information from the memory 740, and control operation of the various drivers 751, 752, 753, 754, and 756.

The ECU 770 may receive transport protocol experts group (TPEG) information, for example, weather information and road traffic situation information from the communication unit 720.

The ECU 770 may combine a plurality of images received from the plurality of cameras 295 to generate an around view image. In particular, when a vehicle travels at predetermined speed or less or moves backward, the around view image may be generated.

The display 780 may display a front image of a vehicle during vehicle driving or an around view image while the vehicle travels slowly. In particular, various user interfaces other than the around view image may be provided.

To display the around view image or the like, the display 780 may include a cluster or a head up display (HUD) installed on an internal front surface of a vehicle. When the display 780 is a HUD, the display 780 may include a projection module for projecting an image onto a windshield of the vehicle 200. The display 780 may include a touchscreen for enabling input.

The audio output unit 785 may convert an electrical signal from the ECU 770 into an audio signal and output the audio signal. To this end, the audio output unit 785 may include a speaker or the like. The audio output unit 785 may output sound corresponding to an operation of the input unit 710, i.e., a button.

The audio input unit 786 may receive user voice. To this end, the audio input unit 786 may include a microphone. The received voice may be converted into an electrical signal and may be transmitted to the ECU 770.

The power supply 790 may supply power required for an operation of each component under control of the ECU 770. In particular, the power supply 790 may receive power from a battery (not shown) or the like in a vehicle.

The stereo camera 195 may be used for an operation of a vehicle driving auxiliary device. This has been described above and, thus, a description thereof is omitted herein.

The plurality of cameras 295 may be used to provide an around view image and, thus, may include four cameras as shown in FIG. 2C. For example, the plurality of cameras 295a, 295b, 295c, and 295d may be arranged at left, rear, right, and front sides of the vehicle. The plurality of images captured by the plurality of cameras 295 may be transmitted to the ECU 770 or a separate processor (not shown).

The internal camera 708 may capture an image of an internal portion of a vehicle in addition to a driver. For example, the internal camera 708 may be an RGB camera or an infrared (IR) camera for heat sensing.

The driver detection sensor 799 may detect body information of a driver. For example, the driver detection sensor 799 may detect blood pressure information, a sleeping wave, and so on of the driver.

The radar 300 may transmit a transmission signal and receive a reception signal reflected by an object around a vehicle. Based on a difference between the transmission signal and the reception signal, distance information may be output. In addition, phase information may be further output.

Figure 8:
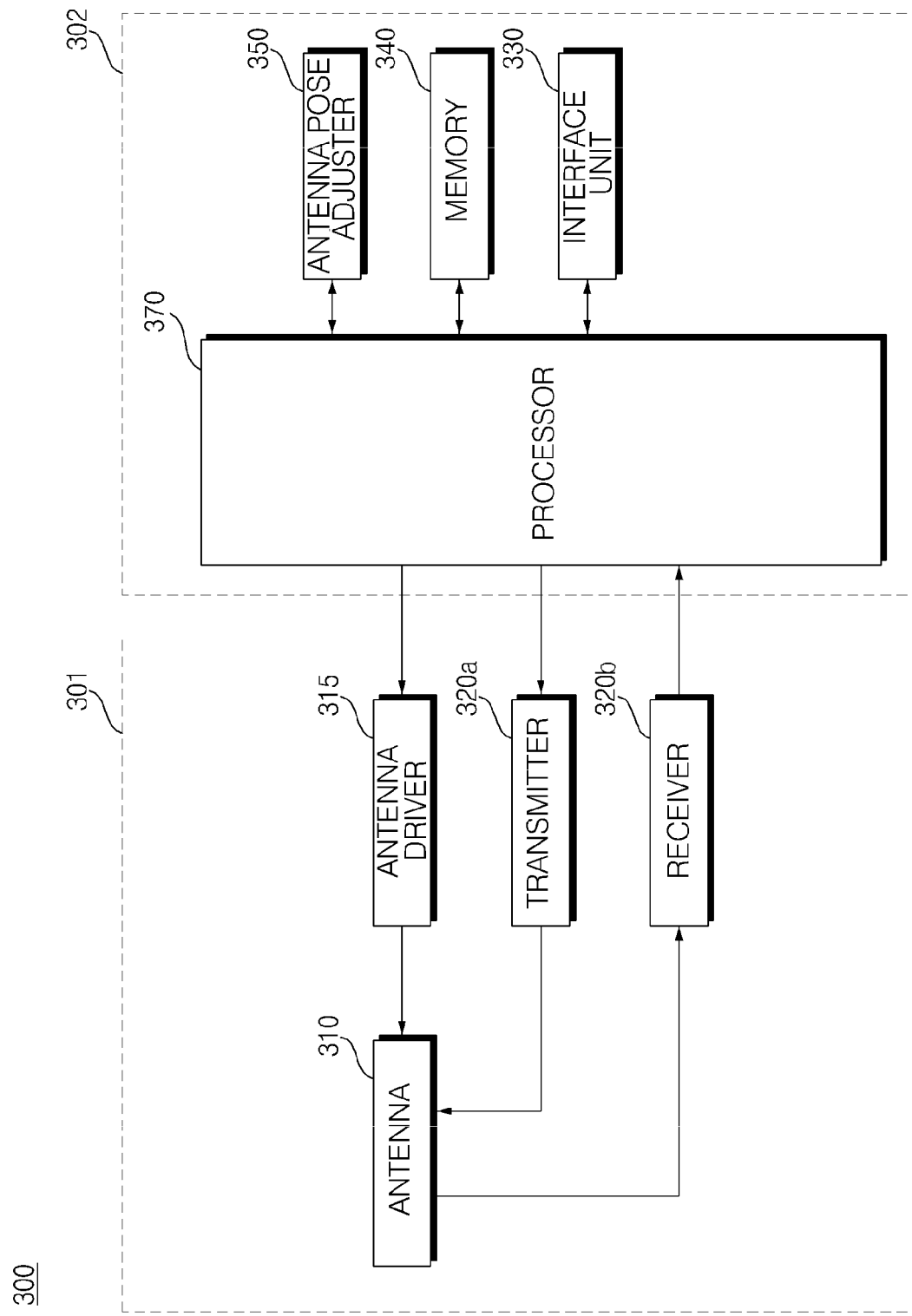
FIG. 8 is an internal block diagram showing an example of a radar for a vehicle according to an embodiment of the present invention.

FIG. 8 is an internal block diagram showing an example of a radar for a vehicle according to an embodiment of the present invention.

Referring to the drawing, the radar 300 according to an embodiment of the present invention may include the antenna 310, a transmitter 320a for externally transmitting a transmission signal through the antenna 310, a receiver 320b for signal-processing a reception signal received from the antenna 310, and the processor 370 for controlling at least one of a direction, an angle, or an intensity of a beam pattern output from the antenna 310 based on image related information from a camera during vehicle driving. A radar beam pattern may be varied based on a camera image.

The radar 300 may further include an antenna driver 315 for applying an electrical signal to the antenna 310 to drive the antenna 310, the memory 340, the interface unit 330 for exchanging data with another device or unit in a vehicle, and an antenna pose adjuster 350 for adjusting a pose of the antenna 310 based on an antenna pose adjustment value.

Here, the camera may be the aforementioned stereo camera 195 of the vehicle driving auxiliary device 100a.

Alternatively, the camera may be the plurality of cameras 295a, 295b, 295c, and 295d in the around view providing device 100b.

An image from a camera outside the radar 300 may be transmitted to the processor 370 through the interface unit 330.

Differently from the drawing, the radar 300 itself may also include a camera for capturing an image of a front part of the vehicle or the processor 370 may acquire an image from a camera that is included therein itself.

The antenna 310, the transmitter 320a, and the receiver 320b may be installed on a first circuit board 301 and the processor 370 and the antenna pose adjuster 350 may be installed on a second circuit board 302 spaced apart from the first circuit board 301.

The antenna 310 may externally output a radar signal or a radar beam to detect a distance from an object around a vehicle or a phase and receive a radar signal or a radar beam reflected by an object around the vehicle.

To this end, the processor 370 may control the antenna driver 315 to apply an electrical signal to the antenna 310.

The transmitter 320a may convert a signal of a baseband into a radio frequency (RF) signal that is a transmission signal.

The receiver 320b may convert a reception signal as an RF signal into a signal of a baseband.

The processor 370 may signal-process a baseband region and calculate distance information or phase information of an object around the vehicle in consideration of a level difference, a phase difference, a time difference, or the like between the transmission signal at the transmitter 320a and the reception signal at the receiver 320b.

The processor 370 may calculate a degree of danger of vehicle crash based on distance information or phase information of an object around a vehicle and generate a control signal for control of at least one of the steering driver 752, the brake driver 753, the suspension driver 756, or the power source driver 754 based on the calculated degree of danger of vehicle crash.

The processor 370 may control at least one of a direction, angle, or intensity of a beam pattern output from the antenna 310 based on image related information from a camera during vehicle driving.

To vary at least one of a direction, an angle, or an intensity of the beam pattern output from the antenna 310, a software or physical solution may be used.

When the software solution is used, the processor 370 may vary an electrical signal applied to the transmitter 320a to vary at least one of a direction, an angle, or an intensity of a beam pattern output from the antenna 310 based on image related information from a camera during vehicle driving.

Figure 9:
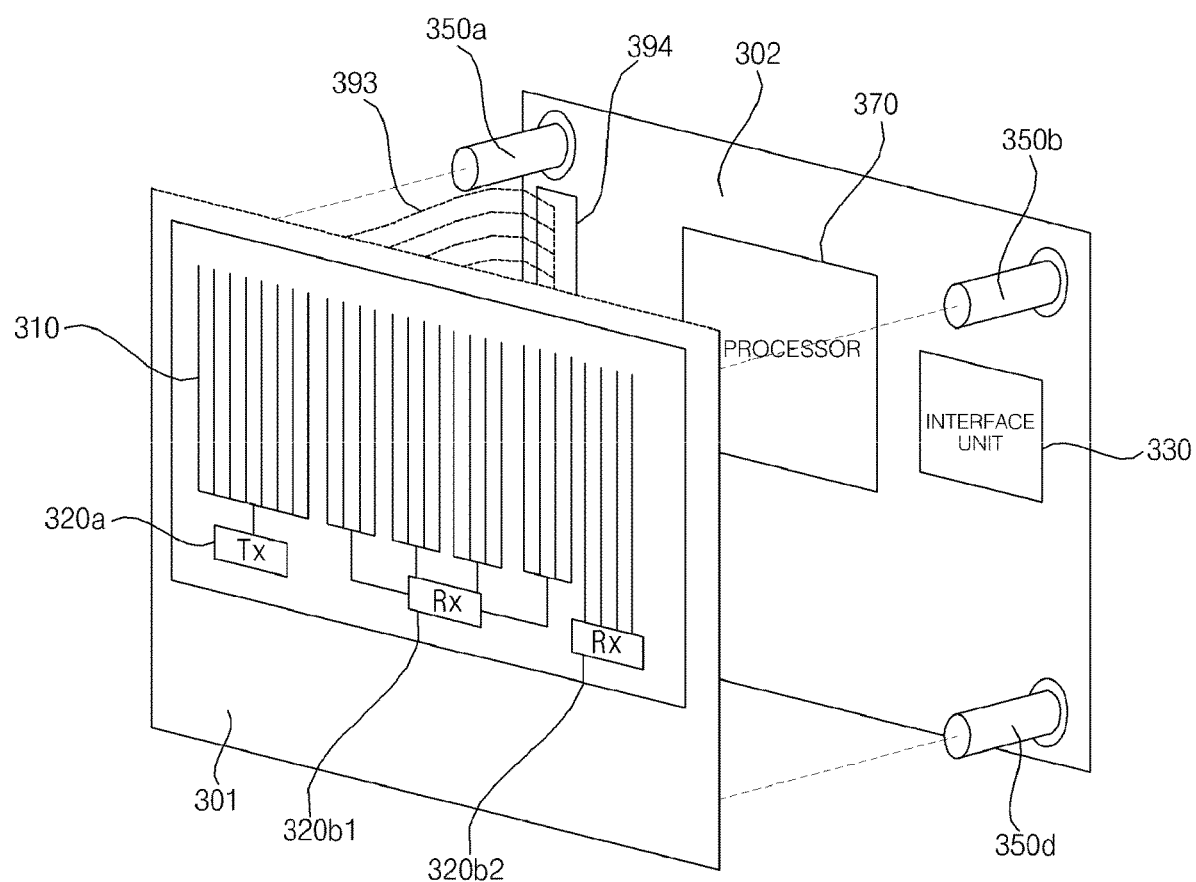
FIG. 9 is a schematic diagram showing a structure of the radar for a vehicle of FIG. 8.

For example, as shown in FIG. 9, when the antenna 310 is configured with a nonlinear patch array, the processor 370 may perform control to operate a portion of the nonlinear patch array based on the image related information from the camera and to vary at least one of a direction, an angle, or an intensity of a beam pattern output from the antenna 310 during vehicle driving. To operate a portion of the nonlinear patch array, the processor 370 may vary an electrical signal applied to the transmitter 320a.

That is, the processor 370 may calculate an instant moving direction of the radar 300 based on the image related information from the camera and vary an electrical signal applied to the transmitter 320a to vary at least one of a direction, angle, or intensity of a beam pattern output from the antenna 310 according to the calculated instant moving direction.

When the physical solution is used, the processor 370 may calculate an instant moving direction of the radar 300 based on the image related information from the camera, calculate a pose adjustment value of the antenna 310 according to the calculated instant moving direction, and control the antenna pose adjuster 350 to vary at least one of a direction, an angle, or an intensity of the beam pattern output from the antenna 310 according to the calculated pose adjustment value.

The pose adjustment value of the antenna may include at least one of position, angle, or direction information of the antenna 310.

The processor 370 may output pose adjustment completion information when a pose of the antenna 310 is completely adjusted and, accordingly, the pose adjustment completion information may be output to the display 480.

The processor 370 may output guidance information for a pose adjustment mode based on a sensor value measured by the sensor 760 during vehicle driving and, thus, output pose adjustment completion information to the display 480.

FIG. 9 is a schematic diagram showing a structure of the radar for a vehicle of FIG. 8.

The radar 300 for a vehicle may separately include an RF end and a baseband end. That is, as shown in the drawing, the first circuit board 301 corresponding to the RF end and the second circuit board 302 corresponding to the baseband end may be spaced apart from each other.

The antenna 310, the transmitter 320a, and the receiver 320b may be installed in the first circuit board 301, and the processor 370 and the antenna pose adjuster 350 may be installed in the second circuit board 302.

The first circuit board 301 and the second circuit board 302 may be electrically connected through an interface unit 393.

The processor 370 may control at least one of a direction, an angle, or an intensity of a beam pattern output from the antenna 310 based on image related information from a camera during vehicle driving.

The processor 370 may vary an electrical signal applied to a transmitter to vary at least one of a direction, an angle, or an intensity of a beam pattern output from the antenna 310 based on image related information from a camera during vehicle driving.

The processor 370 may extract image related information from an image from a camera.

The processor 370 may control at least one of a direction, an angle, or an intensity of a beam pattern output from the antenna 310 based on variation information of a region of interest in an image from a camera during vehicle driving.

Here, the variation information of the region of interest may include variation of a horizontal line, a lane, or a road boundary, or variation information of at least two objects.

For example, the processor 370 may extract variation information of a pre-stored image from a camera and an image from a camera, which is acquired in real time, and calculate an instant moving direction, a moving distance, a moving angle, or the like of the radar 300 based on the variation information. The processor 370 may control at least one of a direction, an angle, or an intensity of a beam pattern output from the antenna 310.

The processor 370 may control the antenna pose adjuster 350 to adjust a direction of a beam pattern output from the antenna 310 based on image related information from a camera during vehicle driving.

In particular, the processor 370 may calculate a pose adjustment value of at least one of position, angle, or direction information of the antenna 310 based on the image related information from the camera.

FIGS. 10 to 15 are diagrams for explanation of an operating method of the radar of FIG. 8.

Figure 10:
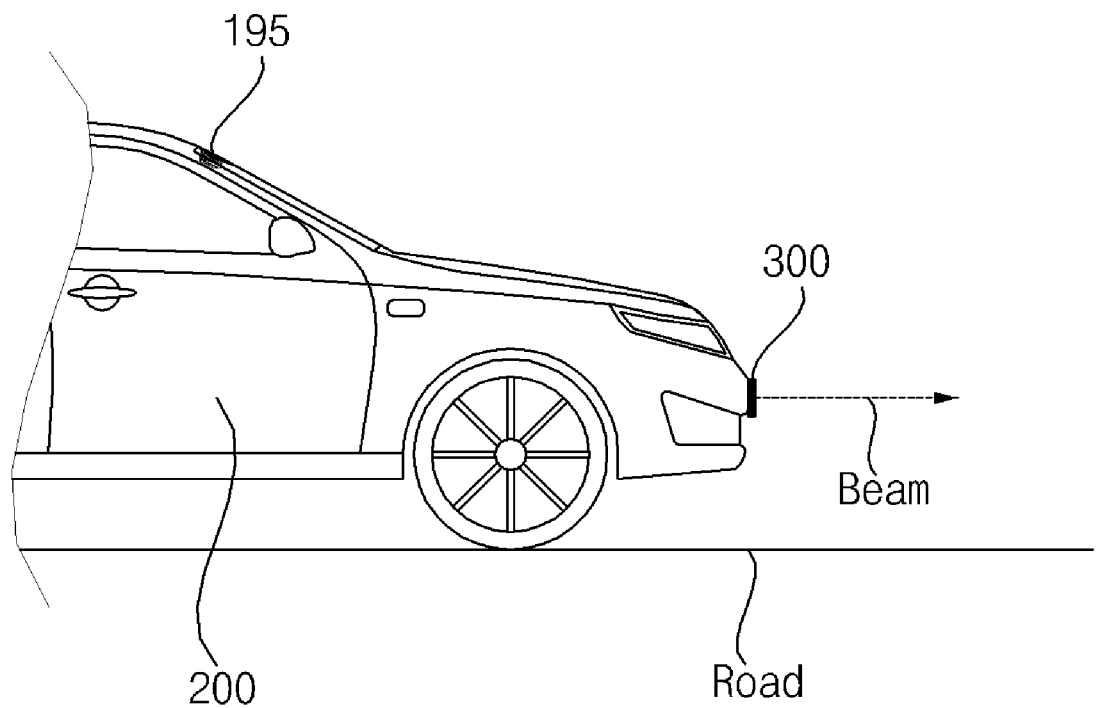
FIGS. 10 to 15 are diagrams for explanation of an operating method of the radar of FIG. 8.

First, FIG. 10 illustrates an example in which the vehicle 200 travels on a flat straight road and the radar 300 is attached to a front end of the vehicle 200. In the example, a camera 195 may be installed on a wind shield.

When the vehicle 200 travels on a flat straight road, a radar beam from the radar 300 may be output in parallel to the flat straight road, as shown in the drawing.

Figure 11A:
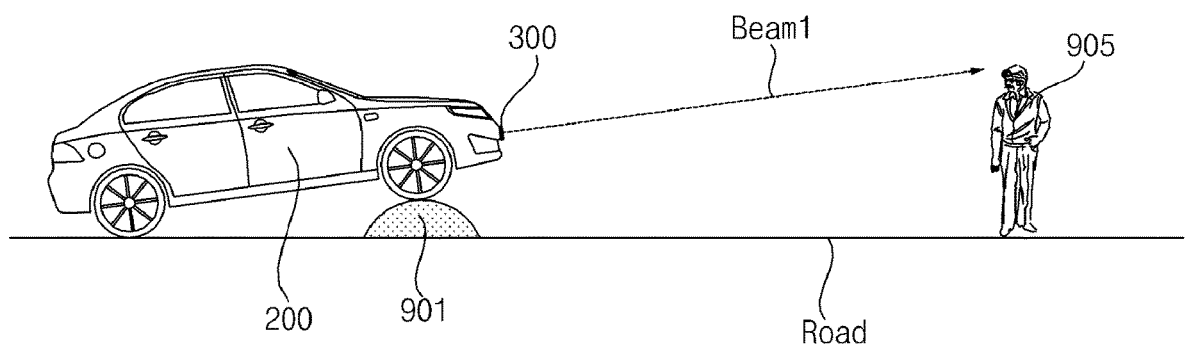

FIG. 11A is a diagram showing a case in which the vehicle 200 passes over a speed bump 901. At a time point when the vehicle 200 passes over the speed bump 901, a radar beam Beam1 from the radar 300 may be output upward to deviate from a front object 905.

Figure 11B:
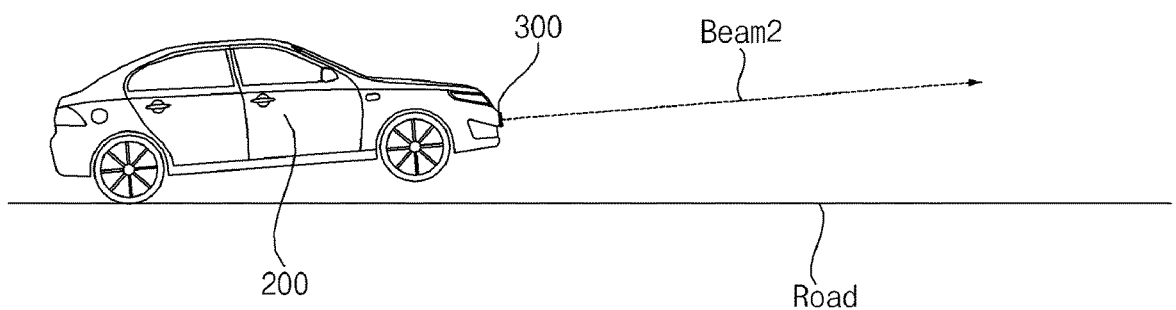

FIG. 11B is a diagram showing an example in which the vehicle 200 quickly starts. At a time point when the vehicle 200 quickly starts, a radar beam Beam2 from the radar 300 may be output upward to deviate from the front object 905.

Figure 11C:
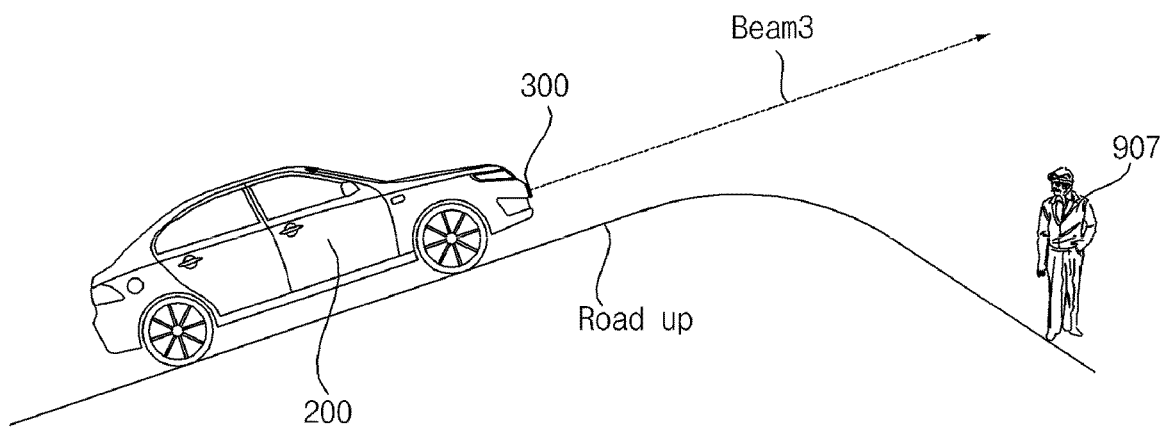

FIG. 11C illustrates an example in which the vehicle 200 passes over an uphill road. At a time point when the vehicle 200 passes over an uphill road, a radar beam Beam3 from the radar 300 may be output upward to deviate from a front object 907.

Figure 11D:
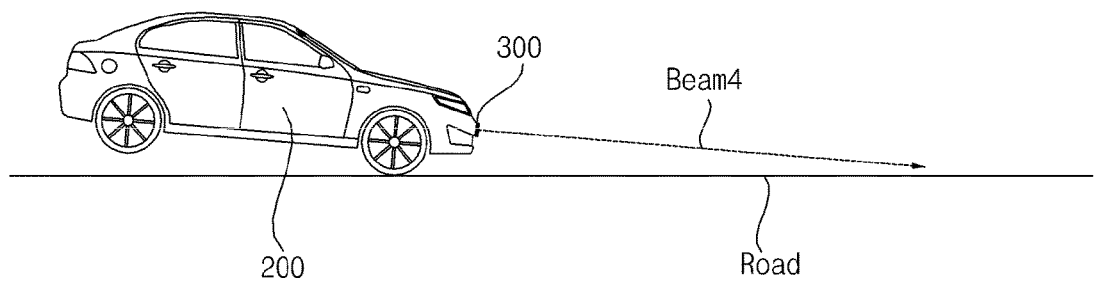

FIG. 11D is a diagram showing an example in which the vehicle 200 suddenly stops. At a time point when the vehicle 200 suddenly stops, a radar beam Beam4 from the radar 300 may be output downward.

Figure 11E:
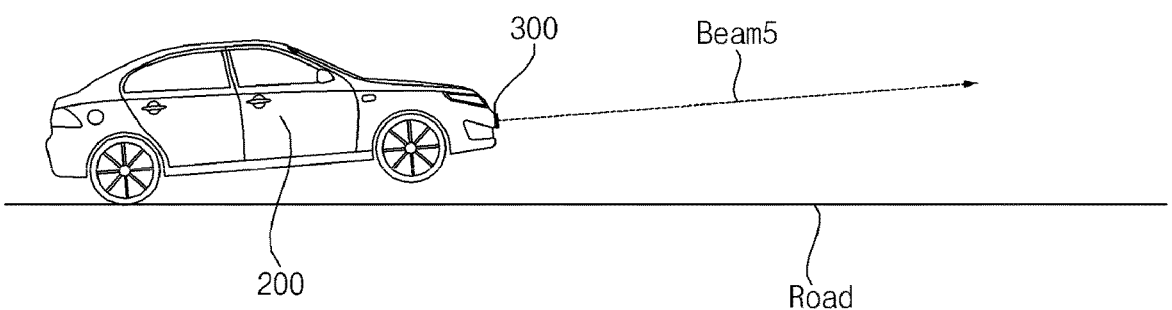

FIG. 11E is a diagram showing a case in which a center of gravity of the vehicle 200 is inclined backward when a passenger gets in a rear seat in the vehicle 200. In this case, a radar beam Beam5 from the radar 300 of the vehicle 200 may be output upward.

FIGS. 11A to 11E except for FIG. 11D illustrate a case in which a radar beam from the radar 300 is directed upward.

According to an embodiment of the present invention, the processor 370 may calculate an instant moving direction or the like of the radar 300 using an image that is continuously received from the camera 195 or the like and perform control to vary at least one of a direction, an angle, or an intensity of a beam pattern output from the antenna 310 to correspond to the instant moving direction.

Figure 12A:
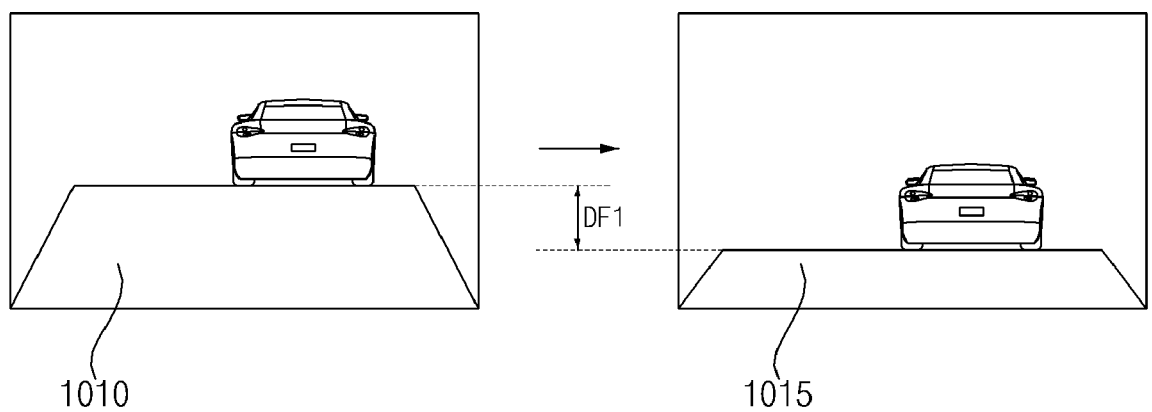

The processor 370 may compare a first view point image 1010 and a second view point image 1015 to calculate variation information DF1 of the first view point image 1010 and the second view point image 1015, as shown in FIG. 12A.

That is, the processor 370 may calculate that the radar 300 of the vehicle 200 is instantly moved upward to correspond to DF1 at a second view point.

Figure 12B:
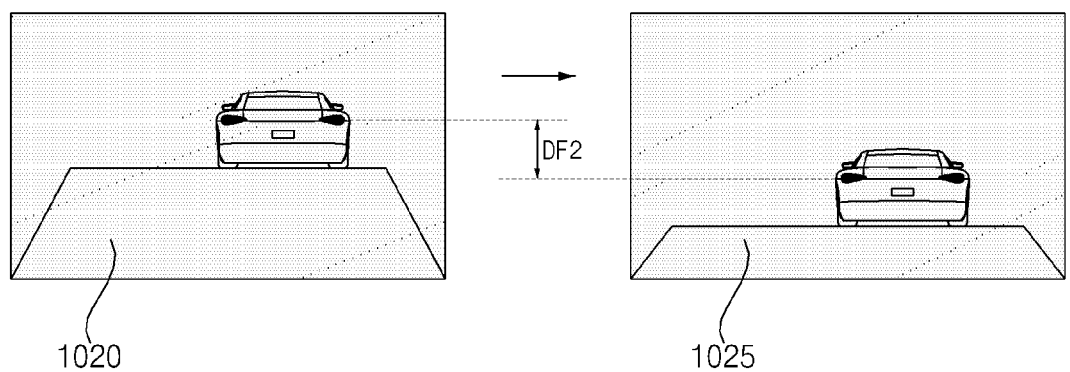

During the nighttime, the processor 370 may compare a third view point image 1020 and a fourth view point image 1025 to calculate variation information DF2 of the third view point image 1020 and the fourth view point image 1025, as shown in FIG. 12B.

That is, the processor 370 may calculate that the radar 300 of the vehicle 200 is instantly moved upward to correspond to DF2 at a fourth time point.

Figure 12C:
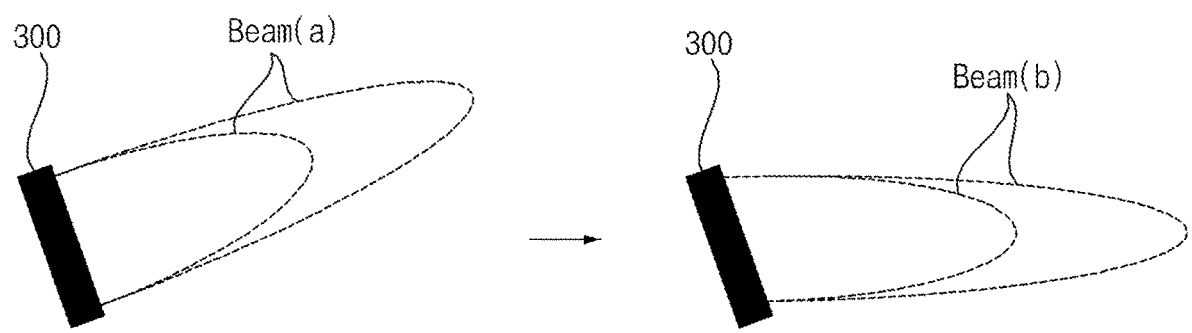

As shown in FIGS. 12A and 12B, when the radar 300 of the vehicle 200 is instantly moved upward, a radar beam Beam(a) output from the radar 300 may be directed upward, as shown in FIG. 12C.

Accordingly, the processor 370 may perform control in such a way that a radar beam Beam(b) output from the antenna 310 is directed upward, as shown in FIG. 12C.

Figure 13A:
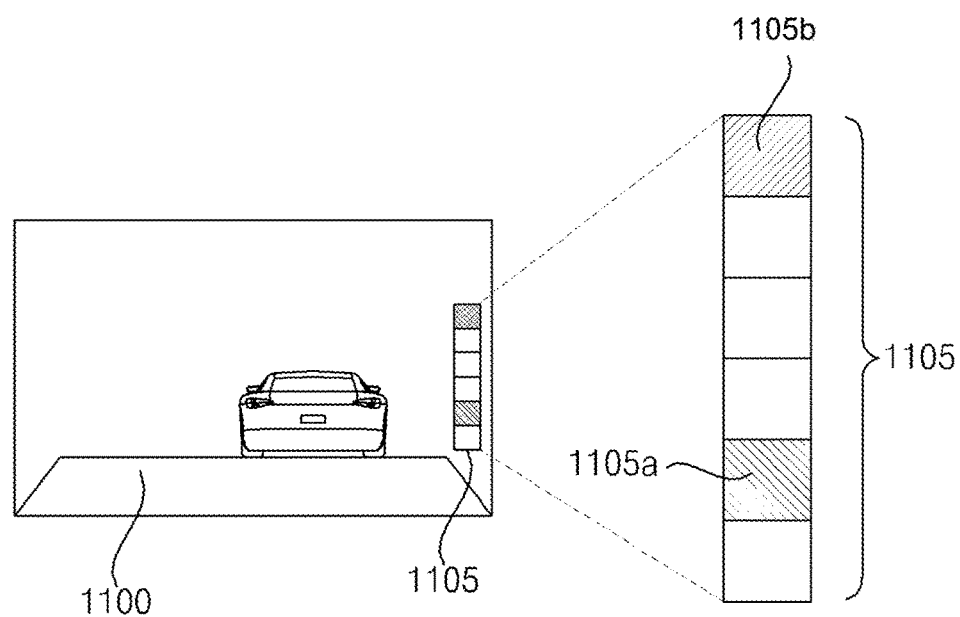

FIG. 13A is a diagram for explanation of calculation of an instant moving value of the radar 300 from a pixel of an image.

For example, when the radar 300 is tilted upward, a difference in variation information may correspond to a difference between a first pixel value 1105a and a second pixel value 1105b in an image 1105.

The processor 370 may calculate an instant tilting value of the radar 300 based on such a pixel difference in an image and calculate a titling angle or a tilting angle variation amount based on the instant tilting value.

Figure 13B:
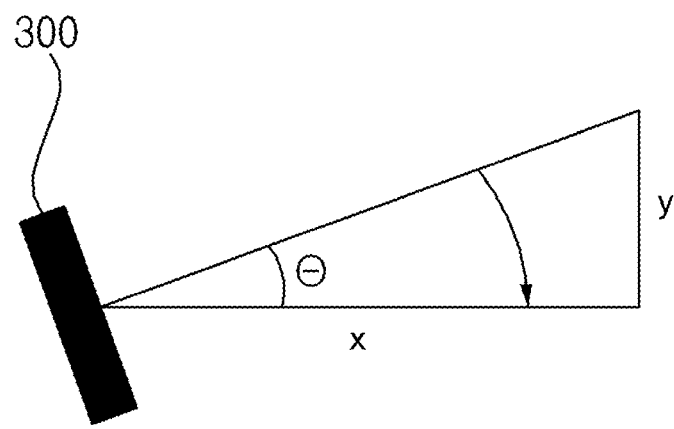

That is, the processor 370 may calculate an instant angle variation amount of the radar 300 using Equation 1 below, as shown in FIG. 13B.

$$\Delta\Theta = \tan^{-1}\Delta y/x \quad \text{[Equation 1]}$$

Figure 13C:
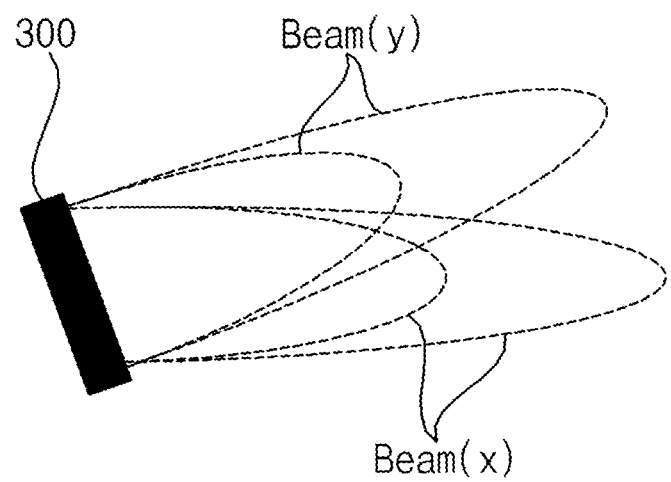

In addition, the processor 370 may control a beam pattern output from the antenna 310 in a downward direction of Beam(x) from Beam(y) to correspond to the angle variation amount calculated according to Equation 1 above, as shown in FIG. 13C.

In particular, the processor 370 may calculate a time point when a vehicle passes over the speed bump 901 based on an image from a camera and perform control to vary a direction of a beam pattern output from the antenna 310 according to the calculated time point.

Accordingly, even if the radar 300 is instantly titled, a radar beam may be stably output frontward of a vehicle. Accordingly, distance information, phase information, and the like of a front side of the vehicle may be accurately detected.

FIG. 15A illustrates a case immediately before the vehicle 200 enters a curved road.

When a radar beam Beam(Ar1) output from the radar 300 is directed toward a front side of the vehicle immediately before the vehicle 200 enters the curved road, distance detection, or the like may not be smoothly performed on a front vehicle on the curved road.

Figure 14A:
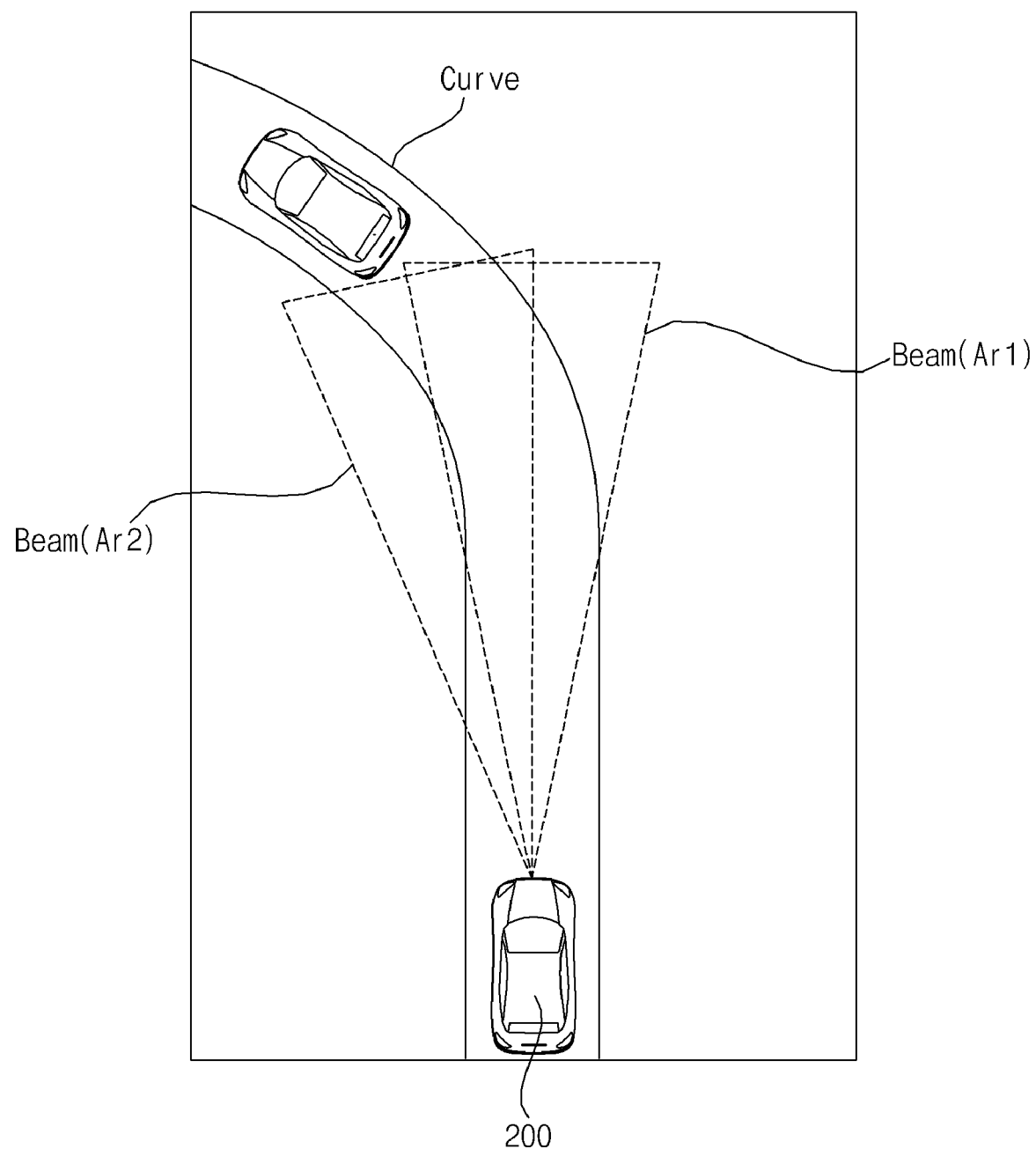
Figure 14B:
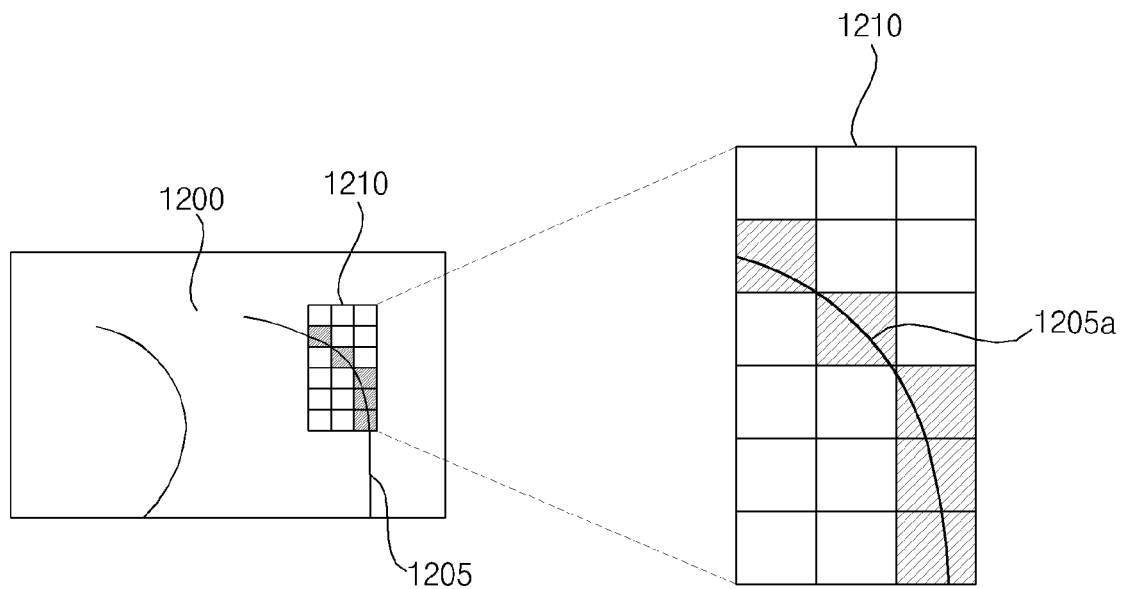

Accordingly, when or immediately before the vehicle 200 enters the curved road, the processor 370 may perform lane detection in an image 1200 from a camera and calculate curvature information using a pixel value 1205 of a lane region 1210, as shown in FIG. 14B.

The processor 370 may perform control to vary a direction of a beam pattern output from the antenna 310 based on curvature information.

Figure 14C:
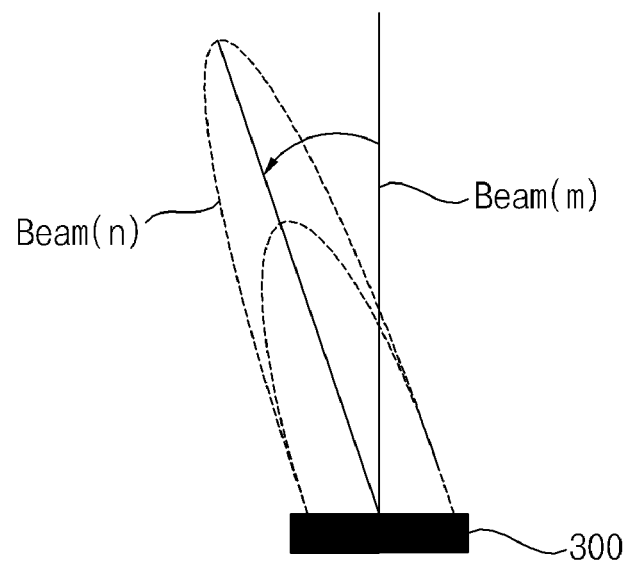

That is, as shown in FIG. 14C, in the case of a left curved road, the processor 370 may perform control to vary a direction of a beam pattern of a radar beam Beam(Ar2) output from the antenna 310 to a left direction.

Accordingly, distance information, phase information, and the like of an object in front of the vehicle may be accurately detected.

Figure 15:
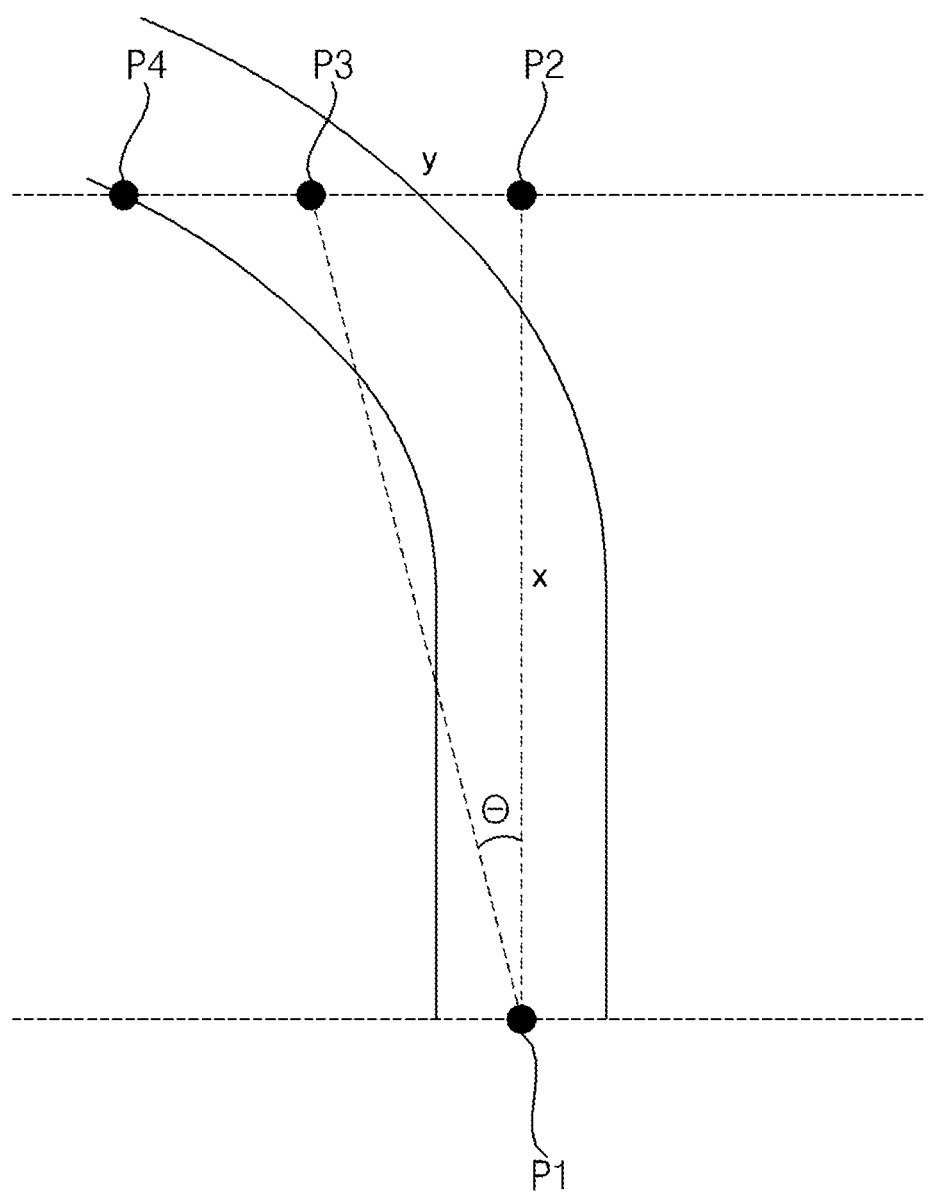

FIG. 15 is a diagram showing another example of variation of a beam pattern direction of a radar beam.

The processor 370 may calculate an angle θ with a center point P3 of a front curved road based on a center point P2 of a road on which a vehicle travels.

In addition, the processor 370 may perform control to vary a direction of a beam pattern output from the antenna 310 based on the calculated angle θ.

The operating method of a radar of a vehicle according to the present invention may also be embodied as processor readable code on a processor readable recording medium in the image display device or the mobile terminal. The processor readable recording medium is any type of recording device that stores processor readable data. Examples of the processor readable recording medium include read-only memory (ROM), random-access memory (RAM), CD-ROMs, magnetic tapes, hard disks, floppy disks, optical data storage devices, and so on. In addition, the processor readable recording medium may also be distributed over network coupled computer systems so that the processor readable code is stored and executed in a distributed fashion.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A radar for a vehicle, comprising:
   an antenna including a nonlinear patch array;
   a transmitter to externally transmit a transmission signal through the antenna;
   a receiver to signal-process a reception signal received from the antenna; and
   a processor to control to operate a portion of the nonlinear patch array and control to change at least one of a direction, an angle, or an intensity of a beam pattern output from the antenna based on image related information from a camera during vehicle driving,
   wherein when the vehicle enters a curved road, the processor detects a lane region based on an image from the camera, calculates curvature information of the curved road using a pixel value of the lane region, and controls to change a direction of a beam pattern output from the antenna based on the curvature information, and
   wherein the processor controls the direction and the angle of the beam pattern output from the antenna to correspond to an angle variation amount calculated according to Equation $\Delta\Theta = \tan^{-1} \Delta y/x$, where x denotes a distance from the vehicle to the lane region, and Δy denotes a difference in variation information corresponding to the lane region.

2. The radar for the vehicle according to claim 1, wherein the processor varies an electrical signal applied to the transmitter to vary at least one of the direction, the angle, or the intensity of the beam pattern output from the antenna based on the image related information from the camera during vehicle driving.

3. The radar for the vehicle according to claim 1, further comprising an interface unit to receive an image from a camera in the vehicle or the image related information.

4. The radar for the vehicle according to claim 1, further comprising a camera,
   wherein the processor extracts the image related information from the image from the camera.

5. The radar for the vehicle according to claim 1, wherein the processor controls at least one of the direction, the angle, or the intensity of the beam pattern output from the antenna based on variation information of a region of interest in the image from the camera during vehicle driving.

6. The radar for the vehicle according to claim 5, wherein the variation information of the region of interest comprises variation information of a horizontal line, a lane, or a road boundary, or variation information of at least two objects.

7. The radar for the vehicle according to claim 1, wherein the antenna, the transmitter, and the receiver are installed on a first circuit board; and wherein the processor is installed on a second circuit board spaced apart from the first circuit board.

8. A vehicle comprising:
a camera;
a radar;
a display; and
an audio output unit,
wherein the radar comprises:
an antenna including a nonlinear patch array;
a transmitter to externally transmit a transmission signal through the antenna;
a receiver to signal-process a reception signal received from the antenna; and
a processor to control to operate a portion of the nonlinear patch array and control to change at least one of a direction, an angle, or an intensity of a beam pattern output from the antenna based on image related information from a camera during vehicle driving, wherein when the vehicle enters a curved road, the processor detects a lane region based on an image from the camera, calculates curvature information of the curved road using a pixel value of the lane region, and controls to change a direction of a beam pattern output from the antenna based on the curvature information, and wherein the processor controls the direction and the angle of the beam pattern output from the antenna to correspond to an angle variation amount calculated according to Equation $\Delta\Theta=\tan^{-1} \Delta y/x$, where x denotes a distance from the vehicle to the lane region, and $\Delta y$ denotes a difference in variation information corresponding to the lane region.

9. The vehicle according to claim 8, wherein the processor varies an electrical signal applied to the transmitter to vary at least one of the direction, the angle, or the intensity of the beam pattern output from the antenna based on the image related information from the camera during vehicle driving.

10. The vehicle according to claim 8, wherein the processor controls at least one of the direction, the angle, or the intensity of the beam pattern output from the antenna based on variation information of a region of interest in the image from the camera during vehicle driving.

11. The vehicle according to claim 10, wherein the variation information of the region of interest comprises variation information of a horizontal line, a lane, or a road boundary, or variation information of at least two objects.

* * * * *